(12) United States Patent
Lescouet et al.

(10) Patent No.: US 8,024,742 B2
(45) Date of Patent: Sep. 20, 2011

(54) COMMON PROGRAM FOR SWITCHING BETWEEN OPERATION SYSTEMS IS EXECUTED IN CONTEXT OF THE HIGH PRIORITY OPERATING SYSTEM WHEN INVOKED BY THE HIGH PRIORITY OS

(75) Inventors: Eric Lescouet, Paris (FR); Vladimir Grouzdev, Saint-Germain-en-Laye (FR)

(73) Assignee: Jaluna S.A., Montigny-le-Bretonneux (FR)

( * ) Notice: Subject to any disclaimer, the term of this patent is extended or adjusted under 35 U.S.C. 154(b) by 1262 days.

(21) Appl. No.: 10/573,881

(22) PCT Filed: Sep. 30, 2004

(86) PCT No.: PCT/IB2004/003334
§ 371 (c)(1),
(2), (4) Date: Nov. 6, 2006

(87) PCT Pub. No.: WO2005/031572
PCT Pub. Date: Apr. 7, 2005

(65) Prior Publication Data
US 2007/0078891 A1     Apr. 5, 2007

(30) Foreign Application Priority Data
Sep. 30, 2003   (EP) .................................. 03292414

(51) Int. Cl.
*G06F 9/46*     (2006.01)
*G06F 9/44*     (2006.01)
*G06F 13/00*    (2006.01)

(52) U.S. Cl. ........ 718/108; 718/103; 718/104; 718/105; 712/228; 711/151; 711/153; 711/173

(58) Field of Classification Search ........................ None
See application file for complete search history.

(56) References Cited

U.S. PATENT DOCUMENTS

| 4,747,040 A | 5/1988 | Blanset et al. |
| 4,764,864 A | 8/1988 | Takane |
| 5,144,692 A | 9/1992 | Baker et al. |
| 5,355,490 A | 10/1994 | Kou |

(Continued)

FOREIGN PATENT DOCUMENTS

EP        0 360 135 A1     3/1990

(Continued)

OTHER PUBLICATIONS

International Search Report mailed Aug. 2, 2006 in International Application No. PCT/IB2004/003334.

(Continued)

*Primary Examiner* — Meng An
*Assistant Examiner* — Abdullah Al Kawsar
(74) *Attorney, Agent, or Firm* — Nixon & Vanderhye PC

(57) ABSTRACT

A method of enabling multiple different operating systems to run concurrently on the same computer, which is an Intel or similar Complex Instruction Set Computer architecture, comprising selecting a first operating system to have a relatively high priority (the realtime operating system, such as C5); selecting at least one secondary operating system to have a relatively lower priority (the general purpose operating system, such as Linux); providing a common program (a hardware resource dispatcher similar to a nanokernel) arranged to switch between said operating systems under predetermined conditions; and providing modifications to said first and second operating systems to allow them to be controlled by said common program.

30 Claims, 15 Drawing Sheets

U.S. PATENT DOCUMENTS

| | | | |
|---|---|---|---|
| 5,499,379 | A | 3/1996 | Tanaka et al. |
| 5,530,858 | A | 6/1996 | Stanley et al. |
| 5,596,755 | A | 1/1997 | Pletcher et al. |
| 5,721,922 | A | 2/1998 | Dingwall |
| 5,740,438 | A | 4/1998 | Ratcliff et al. |
| 5,812,823 | A * | 9/1998 | Kahle et al. ............ 703/26 |
| 5,884,077 | A | 3/1999 | Suzuki |
| 5,903,752 | A | 5/1999 | Dingwall et al. |
| 5,995,745 | A | 11/1999 | Yodaiken |
| 6,134,653 | A * | 10/2000 | Roy et al. ............. 712/228 |
| 6,199,096 | B1 | 3/2001 | Mirashrafi et al. |
| 6,269,409 | B1 | 7/2001 | Solomon |
| 6,381,524 | B1 * | 4/2002 | Kuragaki et al. ......... 701/36 |
| 6,496,847 | B1 * | 12/2002 | Bugnion et al. ........... 718/1 |
| 6,535,929 | B1 | 3/2003 | Provino et al. |
| 6,606,742 | B1 | 8/2003 | Orton et al. |
| 6,615,303 | B1 * | 9/2003 | Endo et al. ............ 710/260 |
| 6,684,261 | B1 | 1/2004 | Orton et al. |
| 6,715,016 | B1 * | 3/2004 | Ohno et al. ............ 710/260 |
| 6,725,289 | B1 * | 4/2004 | Waldspurger et al. ........ 710/9 |
| 6,763,327 | B1 * | 7/2004 | Songer et al. ............ 703/21 |
| 6,782,424 | B2 | 8/2004 | Yodaiken |
| 6,789,156 | B1 * | 9/2004 | Waldspurger ............ 711/6 |
| 6,868,507 | B1 | 3/2005 | Gurumoorthy et al. |
| 6,920,633 | B1 | 7/2005 | Venkatraman et al. |
| 7,036,106 | B1 * | 4/2006 | Wang et al. ............. 716/18 |
| 7,062,766 | B2 | 6/2006 | Ronkka et al. |
| 7,089,377 | B1 * | 8/2006 | Chen ................. 711/147 |
| 7,191,440 | B2 * | 3/2007 | Cota-Robles et al. ......... 718/1 |
| 7,325,233 | B2 * | 1/2008 | Kuck et al. ............. 718/103 |
| 7,356,677 | B1 | 4/2008 | Rafizadeh |
| 7,434,224 | B2 | 10/2008 | Lescouet et al. |
| 7,450,564 | B2 | 11/2008 | Han |
| 2001/0016879 | A1 * | 8/2001 | Sekiguchi et al. ......... 709/319 |
| 2002/0078339 | A1 | 6/2002 | Hung-Ju et al. |
| 2002/0099484 | A1 * | 7/2002 | Kuragaki et al. .......... 701/36 |
| 2002/0161961 | A1 | 10/2002 | Hardin et al. |
| 2003/0036843 | A1 | 2/2003 | Okude et al. |
| 2003/0037089 | A1 | 2/2003 | Cota-Robles et al. |
| 2003/0204780 | A1 | 10/2003 | Dawkins et al. |
| 2004/0010788 | A1 * | 1/2004 | Cota-Robles et al. .......... 718/1 |
| 2004/0083308 | A1 | 4/2004 | Sebastian et al. |
| 2004/0177193 | A1 | 9/2004 | Ohno et al. |
| 2007/0022421 | A1 | 1/2007 | Lescouet et al. |
| 2007/0033260 | A1 | 2/2007 | Grouzdev et al. |
| 2007/0074223 | A1 | 3/2007 | Lescouet et al. |

FOREIGN PATENT DOCUMENTS

| | | |
|---|---|---|
| EP | 1 054 322 | 11/2000 |
| EP | 1 054 332 A1 | 11/2000 |
| EP | 1 059 582 A2 | 12/2000 |
| EP | 1 162 536 A1 | 12/2001 |

OTHER PUBLICATIONS

"Jaluna-2 Preview Release 1 Description," Jaluna Product Documentation, Dec. 2002, pp. 1-32.

Office Action mailed Jun. 24, 2010 in U.S. Appl. No. 10/552,608.

Office Action mailed Aug. 30, 2010 in U.S. Appl. No.10/573,918.

Tanenbaum, Andrew S., Computer Networks, 4$^{th}$ Ed., Prentice Hall, Aug. 2002.

Abrossimov, et al., "Fast Error Recovery in CHORUS/OS: The Hot-Restart Technology," pp. 1-14 (Aug. 30, 1996).

Yaghmour, K., "Adaptive Domain Environment for Operating Systems," described in a White Paper at http://opersys.com/ftp/pub/adeos/adeos.pdf/, 7 pages.

Armand, F., "ChorusOS 5.0 Features and Architecture Overview," Sun Technical Report, No. 806-6897-10, Sun Microsystems, Palo Alto, CA, USA, pp. 1-223 (Dec. 2001).

International Search Report dated Mar. 17, 2005 in PCT/EP2004/003731.

International Search Report for PCT/EP2004/006606 mailed Dec. 2, 2004.

European Search Report dated Nov. 4, 2004 in EP 03 29 0894.

Office Action dated Oct. 12, 2007 in U.S. Appl. No. 10/665,352 (USP 7,434,224).

Office Action dated Apr. 26, 2007 in U.S. Appl. No. 10/665,352 (USP 7,434,224).

Office Action mailed Jun. 23, 2010 in U.S. Appl. No. 10/566,274.

Office Action mailed Oct. 27, 2009 in U.S. Appl. No. 10/566,274.

Office Action mailed Feb. 26, 2009 in U.S. Appl. No. 10/566,274.

Office Action mailed Jun. 26, 2008 in U.S. Appl. No. 10/566,274.

* cited by examiner

Fig. 14 Initial TSS

Fig. 15  Nanokernel TSS

Fig. 16 Nanokernel TSS Stack

COMMON PROGRAM FOR SWITCHING BETWEEN OPERATION SYSTEMS IS EXECUTED IN CONTEXT OF THE HIGH PRIORITY OPERATING SYSTEM WHEN INVOKED BY THE HIGH PRIORITY OS

This application is the US national phase of international application PCT/IB2004/003334, filed 30 Sep. 2004, which designated the U.S. and claims priority of EP 03292414.4, filed 30 Sep. 2003 (published as EP 1673697 (A2) as of Jun. 28, 2006), the contents of each of which are hereby incorporated by reference.

TECHNICAL FIELD

This invention relates to operating systems. More particularly, this invention relates to systems, methods and computer programs for running multiple operating systems concurrently.

BACKGROUND

For some computer programs, it is critical that steps in the program are performed within defined time periods, or at defined times. Examples of such programs are control programs for operating mobile telephones, or for operating private branch exchanges (PBXs) or cellular base stations. Typically, the program must respond to external events or changes of state in a consistent way, at or within a certain time after the event. This is referred to as operating in "real time".

For many other programs, however, the time taken to execute the program is not critical. This applies to most common computer programs, including spreadsheet program, word processing programs, payroll packages, and general reporting or analysis programs. On the other hand, whilst the exact time taken by such programs is not critical, in most cases, users would prefer quicker execution where this is possible.

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several programs to operate concurrently. To do so, they provide scheduling; in other words, they share the usage of the resources of the computer between the different programs, allocating time to each in accordance with a scheduling algorithm. Operating systems of this kind are very widely used, but they generally make no provision for running real time applications, and they therefore are unsuitable for many control or communications tasks.

For such tasks, therefore, real time operating systems have been developed; one example is ChorusOS (also known as Chorus) and its derivatives. Chorus is available as open source software.

It is described in "ChorusOS Features and Architecture overview," Francois Armand, Sun Technical Report, August 2001, 222p.

These operating systems could also be used to run other types of programs. However, users understandably wish to be able to run the vast number of "legacy" programs which are written for general purpose operating systems such as Windows or Linux, without having to rewrite them to run on a real time operating system.

It would be possible to provide a "dual boot" system, allowing the user to run either one operating system or the other, but there are many cases where it would be desirable to be able to run a "legacy" program at the same time as running a real time program. For example, telecommunications network infrastructure equipment, third generation mobile phones and other advanced phones, and advanced electronic gaming equipment may require both realtime applications (e.g. game playing graphics) and non-realtime applications (game download).

In U.S. Pat. No. 5,903,752 and U.S. Pat. No. 5,721,922, an attempt is made to incorporate a real time environment into a non real time operating system by providing a real time multi-tasking kernel in the interrupt handling environment of the non real time operating system (such as Windows).

One approach which has been widely used is "emulation". Typically, an emulator program is written, to run under the real time operating system, which interprets each instruction of a program written for a general purpose operating system, and performs a corresponding series of instructions under the real time operating system. However, since one instruction is always replaced by many, emulation places a heavier load on the computer, and results in slower performance. Similar problems arise from the approach based on providing a virtual machine (e.g. a Java™ virtual machine). Examples of virtual machine implementations are EP 1059582, U.S. Pat. No. 5,499,379, and U.S. Pat. No. 4,764,864.

A further similar technique is described in U.S. Pat. No. 5,995,745 (Yodaiken). Yodaiken describes a system in which a multi tasking real time operating system runs a general purpose operating system as one of its tasks, pre-empting it as necessary to perform real time tasks.

Another approach is to run the realtime operating system as a module of the general purpose operating system, as described in for example EP 0360135 and the article "Merging real-time processing and UNIX V", (Gosch), ELECTRONICS, September 1990 p 62. In this case, hardware interrupts are selectively masked with the intention that those concerned with the general purpose operating system should not pre-empt the realtime operating system.

Another approach is that of ADEOS (Adaptive Domain Environment for Operating Systems), described in a White Paper.

ADEOS provides a nanokernel which is intended, amongst other things, for running multiple operating systems although it appears only to have been implemented with Linux. One proposed use of ADEOS was to allow ADEOS to distribute interrupts to RTAI (Realtime Application Interface for Linux).

EP 1054332 describes a system in which a "switching unit" (which is not described in sufficient detail for full understanding) runs a realtime and a general purpose operating system. Hardware interrupts are handled by a common interrupt handler, and in some embodiments, they are handled by the realtime operating system, which then generates software interrupts at a lower priority level which are handled by routines in the secondary operating system.

BRIEF SUMMARY

An object of the present invention is to provide an improved system, method and computer program for running multiple operating systems simultaneously, even when the systems are designed for different purposes. In particular, the present invention aims to allow one of the operating systems (for example, a real time operating system to perform without disturbance, and the other (for example, a general purpose operating system) to perform as well as possible using the remaining resources of the computer.

Accordingly, in one aspect, the present invention provides a system in which multiple operating systems are slightly modified and provided with a common program which schedules between them, in which one of the operating systems (the "primary" or "critical" operating system) is favoured over another (the "secondary" or non-critical operating system). Preferably, the invention allocates hardware preferentially to the critical operating system, and it denies the secondary operating system or systems access which would interfere with that of the critical operating system. Preferably, the present invention uses the critical operating system drivers to access shared resources, even if the access is requested by the secondary operating system. However, in no sense is the critical operating system "running" the secondary operating system, as in U.S. Pat. No. 5,995,745; each system ignores the others running alongside it and only communicates with the common program (corresponding to a nanokernel of the prior art) which brokers the access to the drivers of the critical operating system.

Preferably, the secondary operating systems are modified so that they cannot mask interrupts, and their interrupt service routines are modified to make them responsive to messages indicating that an interrupt occurred. The common program handles all hardware exceptions by passing them to the interrupt service routines of the primary operating system, and where a hardware interrupt was intended for one of the secondary operating systems, an interrupt message or notification is generated. Next time that secondary operating system is scheduled by the common program, the message or notification is passed to it, and the common program calls its interrupt service routine to service the interrupt.

Thus, the secondary operating systems cannot pre-empt the primary operating system (or, in general, a higher importance secondary operating system) in any way on occurrence of an interrupt, since all are initially handled by the primary operating system and only notified to the secondary operating system for which they are destined after the primary operating system has finished execution and that secondary operating system is scheduled.

Handling of such interrupts is thus deferred until no critical task in the primary operating system is occurring. When they are eventually actioned, however, the routines of the secondary operating system may operate in substantially unmodified fashion so that the behaviour is (except for the delay) as expected by the secondary operating system.

Such a system is described in our earlier-filed PCT application PCT/EP04/00371, incorporated herein by reference.

BRIEF DESCRIPTION OF THE DRAWINGS

This invention relates to an implementation on a Complex Instruction Set Computer (CISC) such as one based on the Intel IA-32 architecture. CISC processors have multiple registers, the states of which need to be saved and retrieved on switching between operating systems. They may have multiple memory addressing modes, so that different operating systems may be running applications in different modes, and they may have sophisticated data structures the states of which need to be saved and retrieved. Such factors make it non-trivial to implement a system whereby multiple operating systems can execute concurrently and in a stable fashion.

For a background understanding of the well known Intel IA-32 architecture, the following are incorporated by reference:

Intel Architecture Software Developer's Manual, Volume 1: Basic Architecture (Order Number 245470-011)
Intel Architecture Software Developer's Manual, Volume 2: Instruction Set Reference (Order Number 245471-011)
Intel Architecture Software Developer's Manual, Volume 3: System Programming Guide (Order Number 245472-011)
All are available free of charge from Intel Corporation, PO Box 7641, Mt. Prospect, Ill. 60056-7641.

Without limitation, some of the innovative features which are disclosed herein are as follows:

A—The adaptation of the operating systems to replace processor instructions by calls to methods, which use the resources of the hardware resource despatcher; and particularly but not exclusively;

B—substitution of instructions which read or write memory addressing data structures such as vector tables (such as the GDT and IDT tables), allowing;

C—replication of the original memory addressing data structures (such as the GDT and IDT tables) to provide proxy data structures for operating systems such as Linux, called by the methods instead of accessed through the replaced processor calls, leaving the original memory addressing data structures for access by the hardware resource despatcher;

D—provision of "public" or "open" parts and "private" or "hidden" parts within the data structures used by the hardware resource despatcher;

E—"lazy" transfer of the Floating Point Unit (FPU) between operating systems, as well as (as is known) between applications on a single operating system;

F—Use of task gates to switch cleanly between operating systems, and

G—Use of some specific routines rather than task gates to switch rapidly between the primary operating system and the hardware resource despatcher without changing memory context (so that not all registers need to be saved, making the switch faster);

H—Preventing the secondary operating system from masking interrupts, except, preferably;

I—during task switching operations (which are of very short duration) and/or;

J—during hardware resource despatcher operations which are of very long duration (such as RS-232 communications or character output);

K—use of two separate stack structures for context switching; one for traps and one for asynchronous tasks;

L—use of part of the supervisory context of the primary operating system to run the hardware resource despatcher.

Other aspects, embodiments and preferred features, with corresponding advantages, will be apparent from the following description, claims and drawings.

Figure 1:
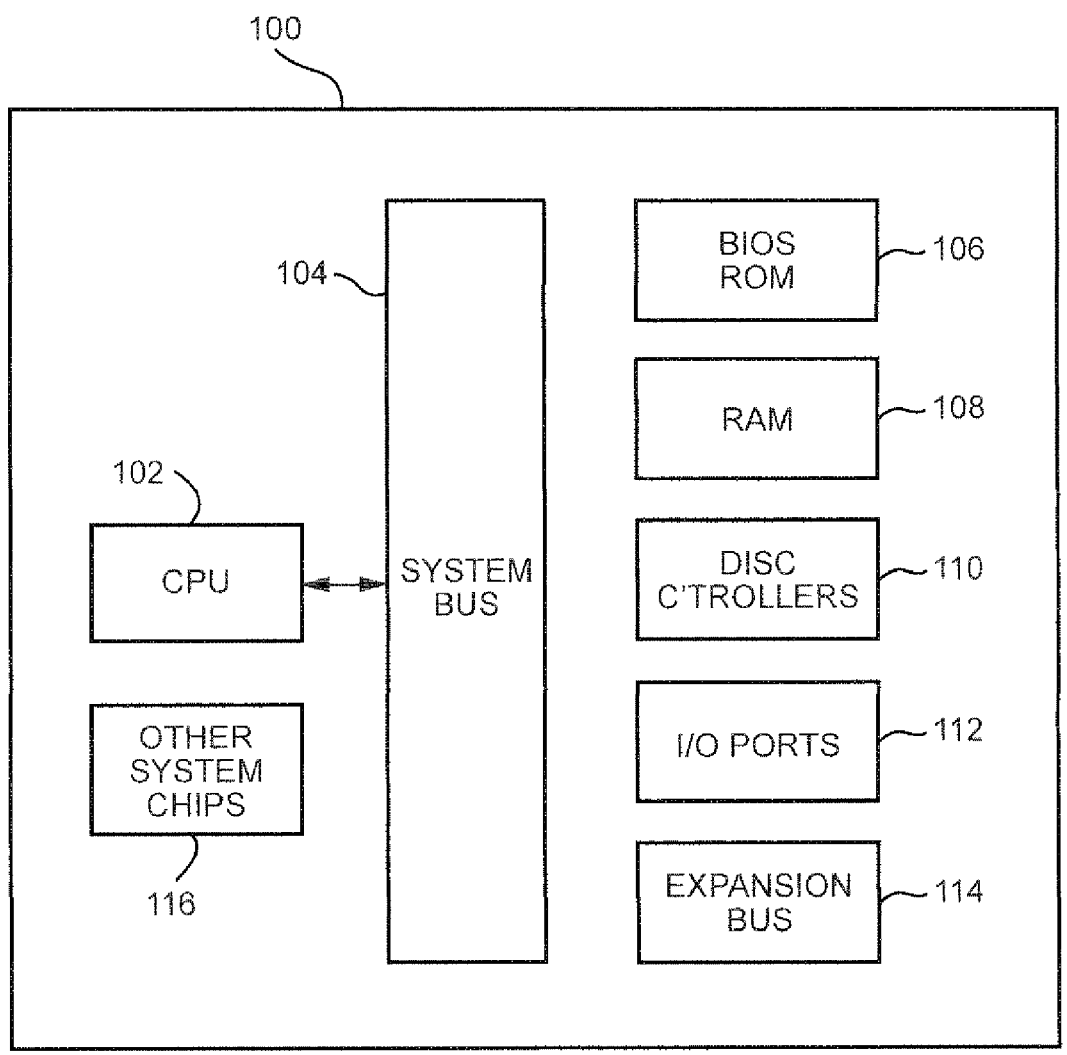
Figure 2A:
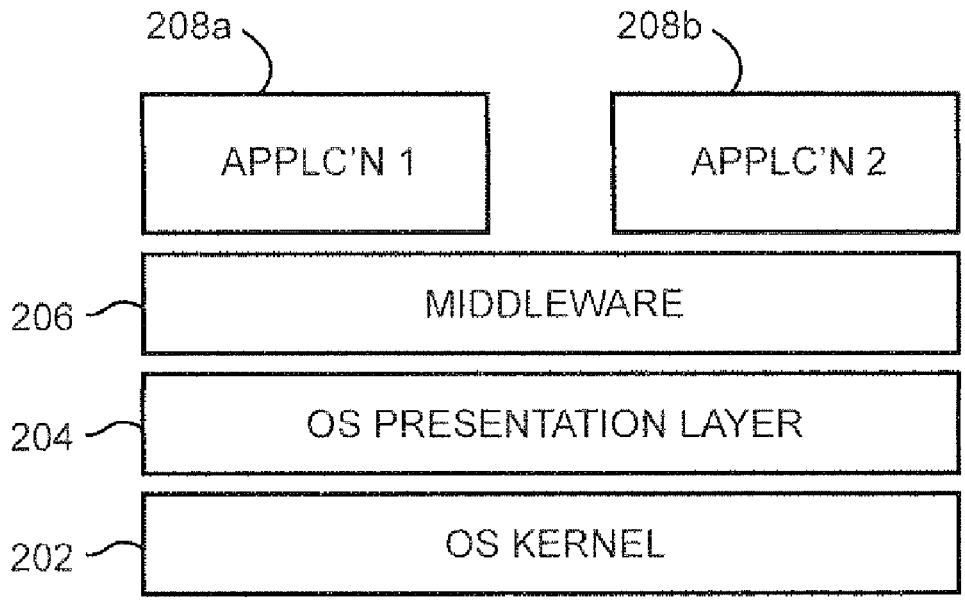
Figure 2B:
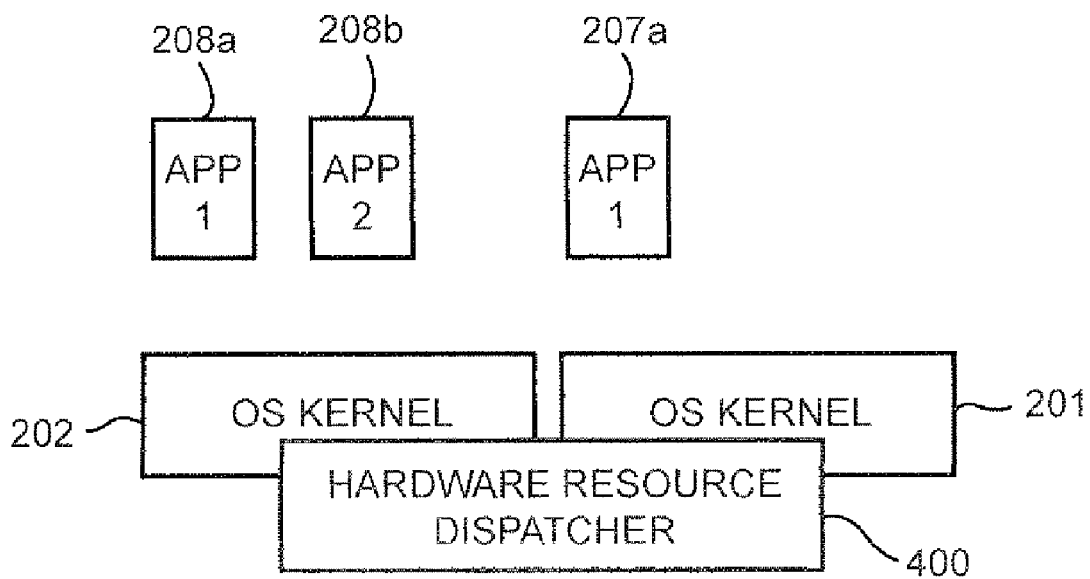
Figure 3:
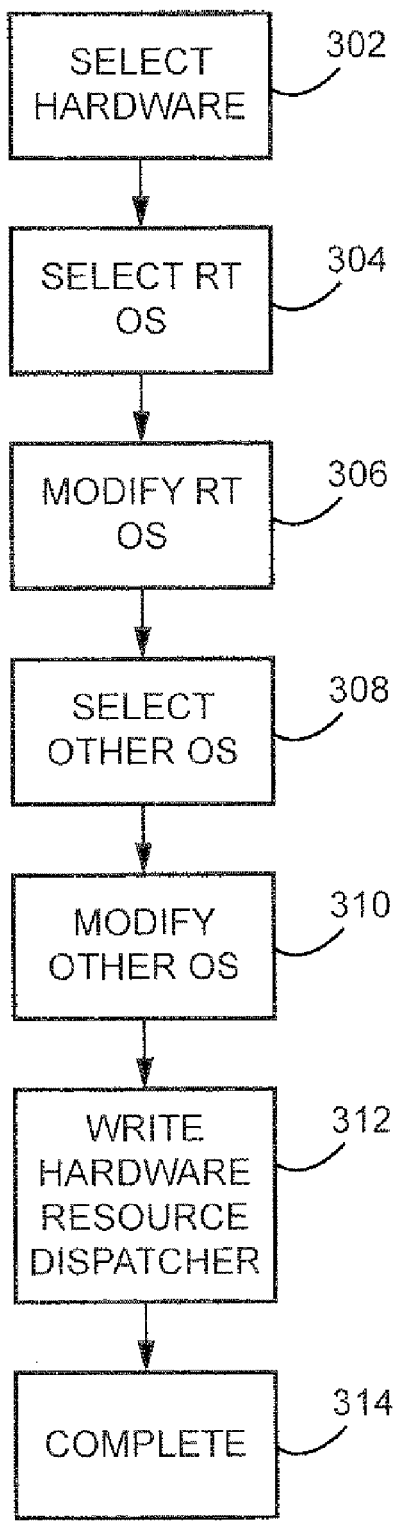
Figure 4:
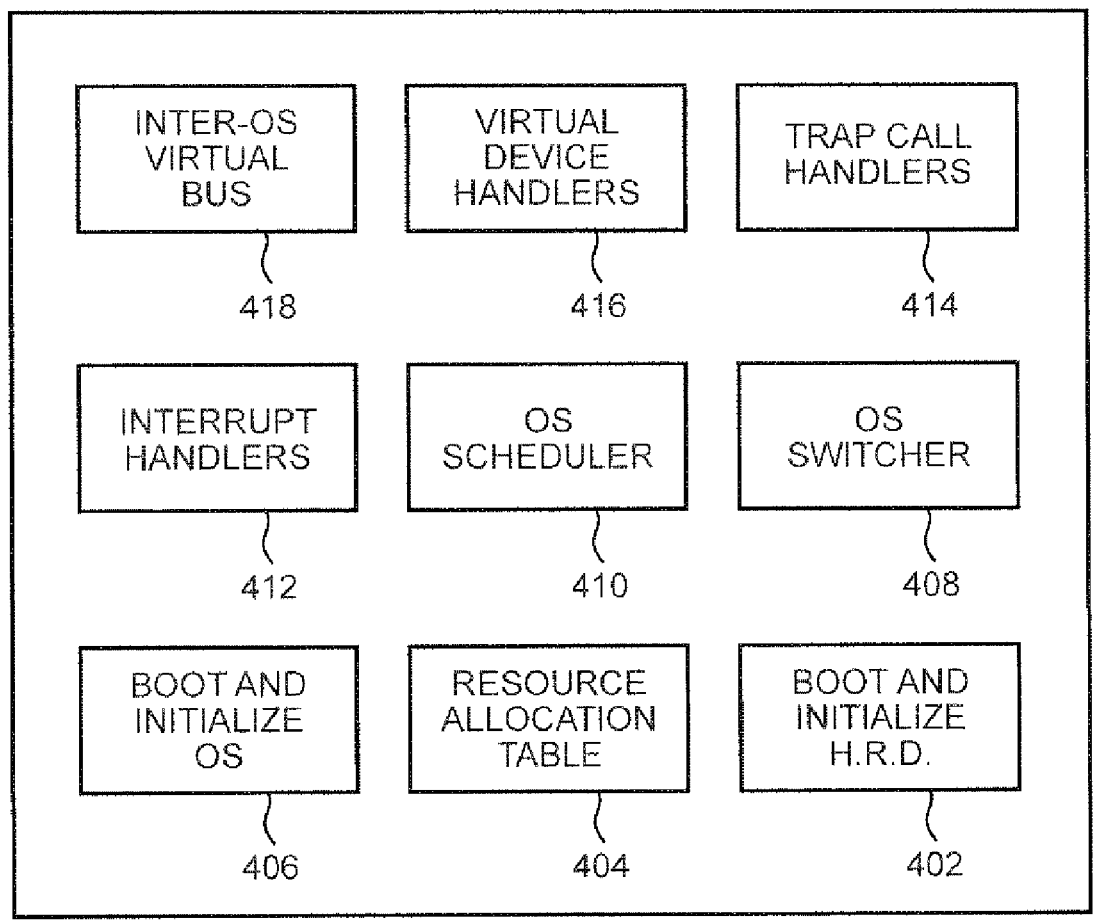
Figure 5:
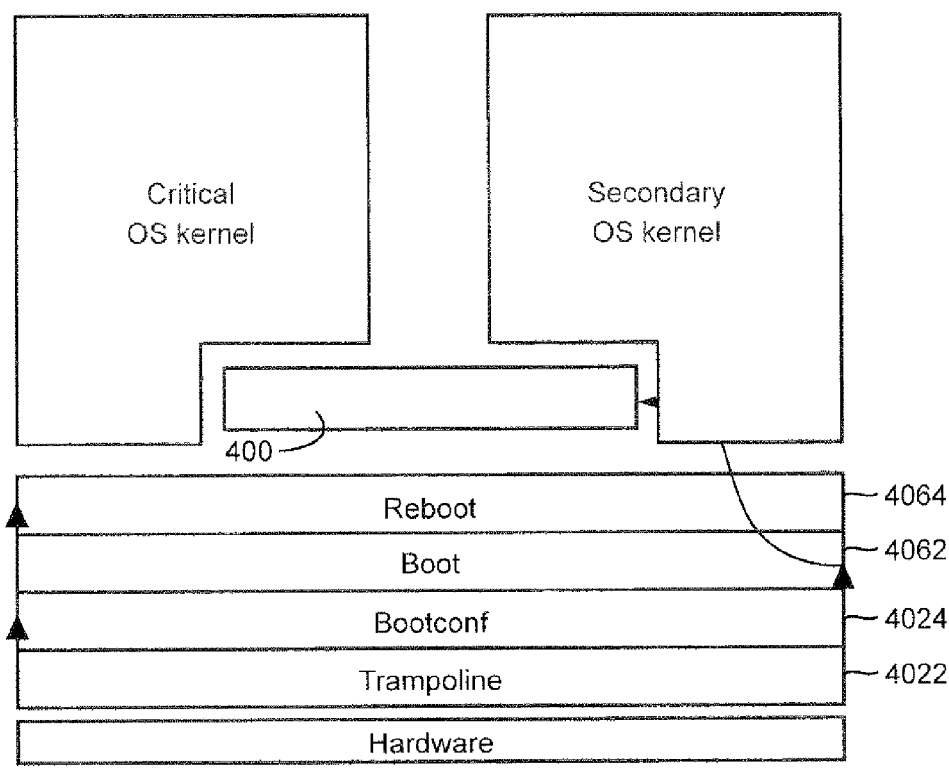
Figure 6:
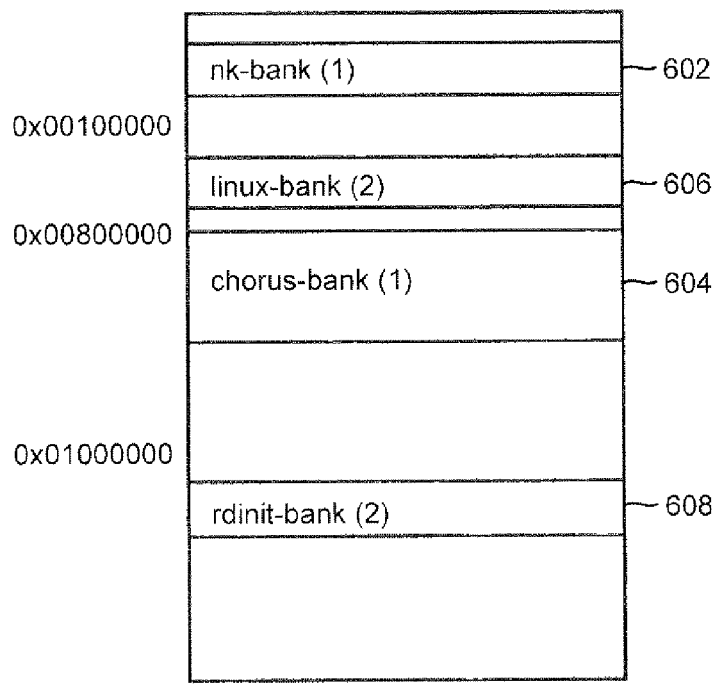
Figure 7:
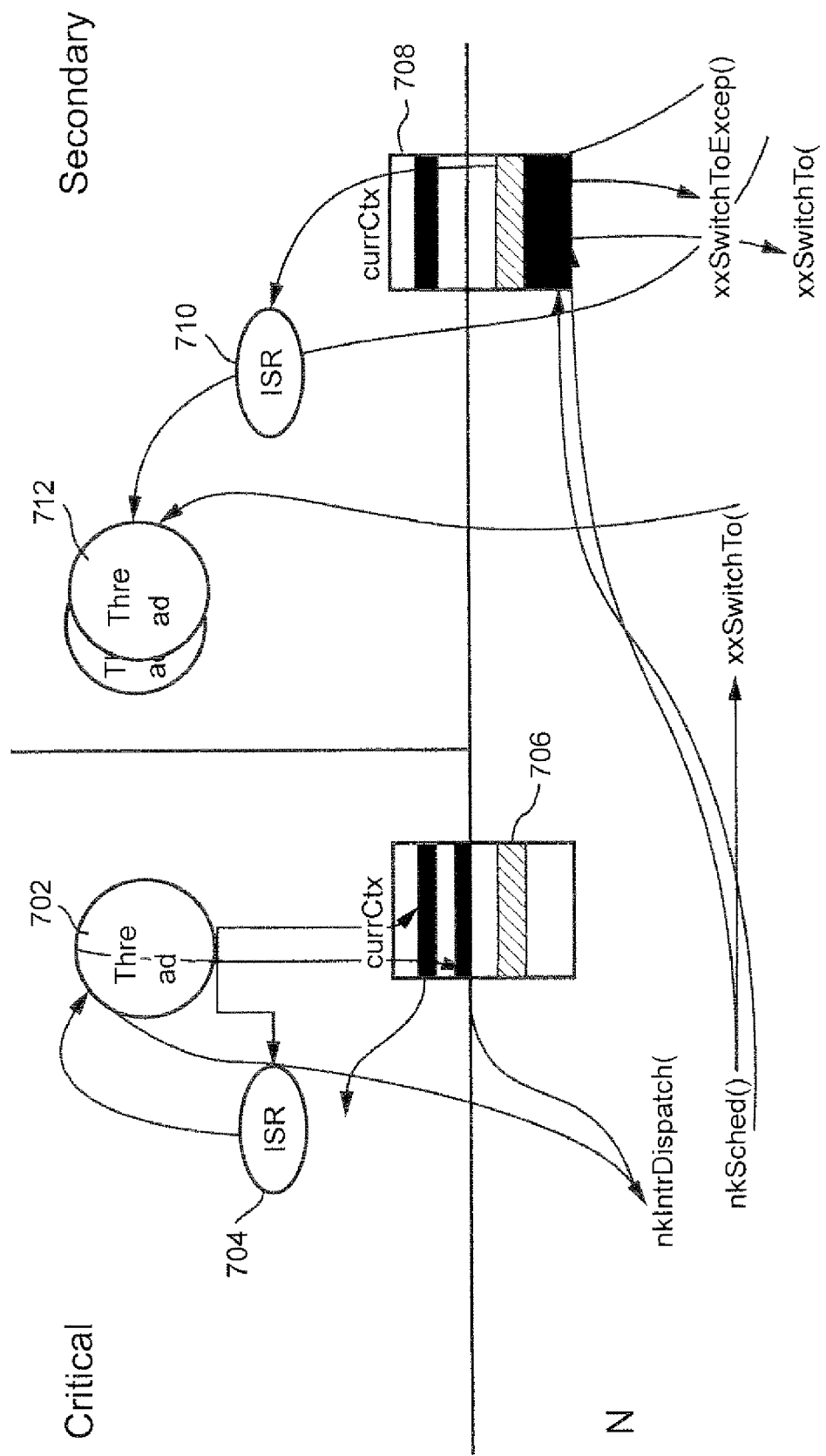
Figure 8:
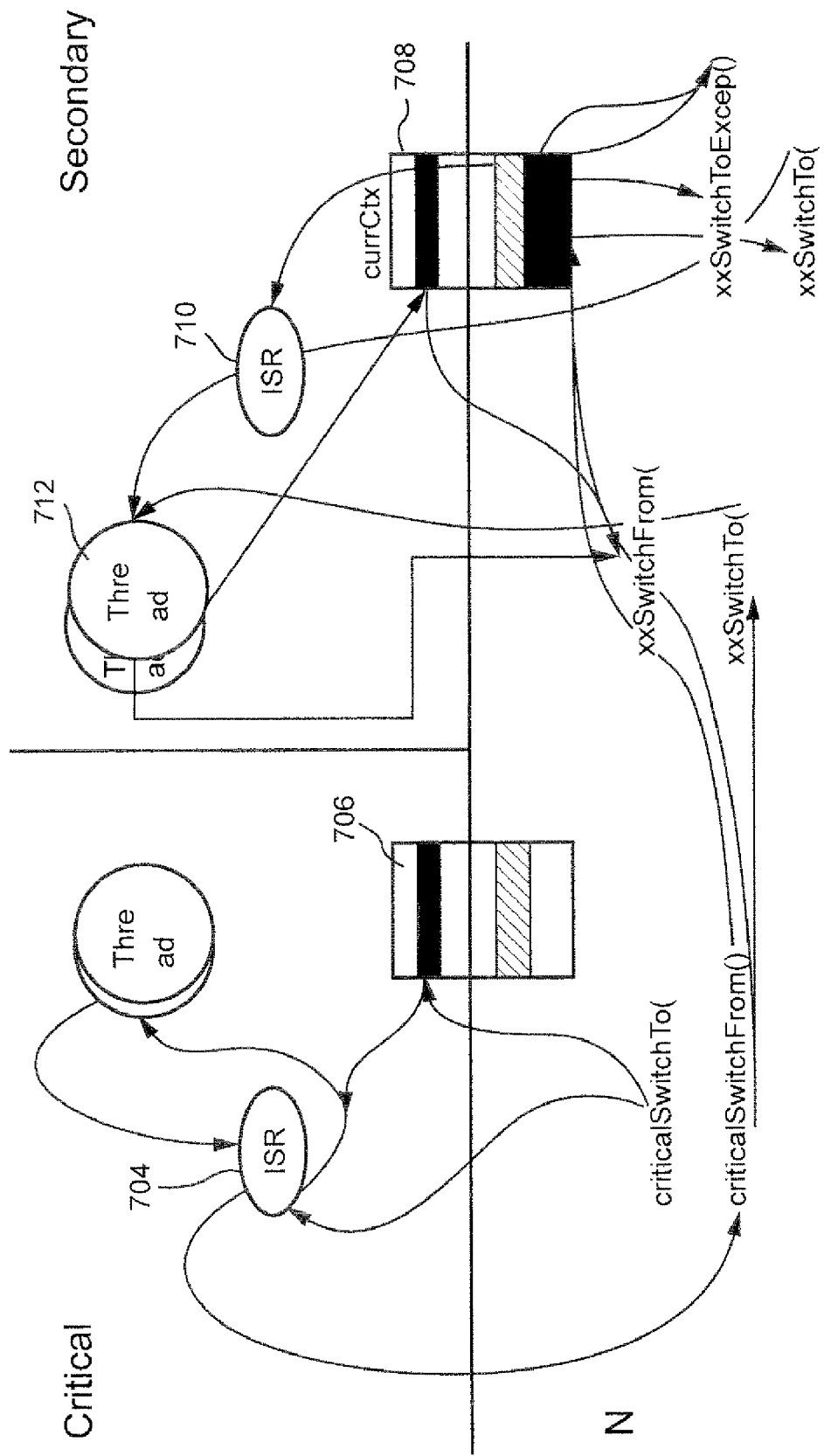
Figure 9A:
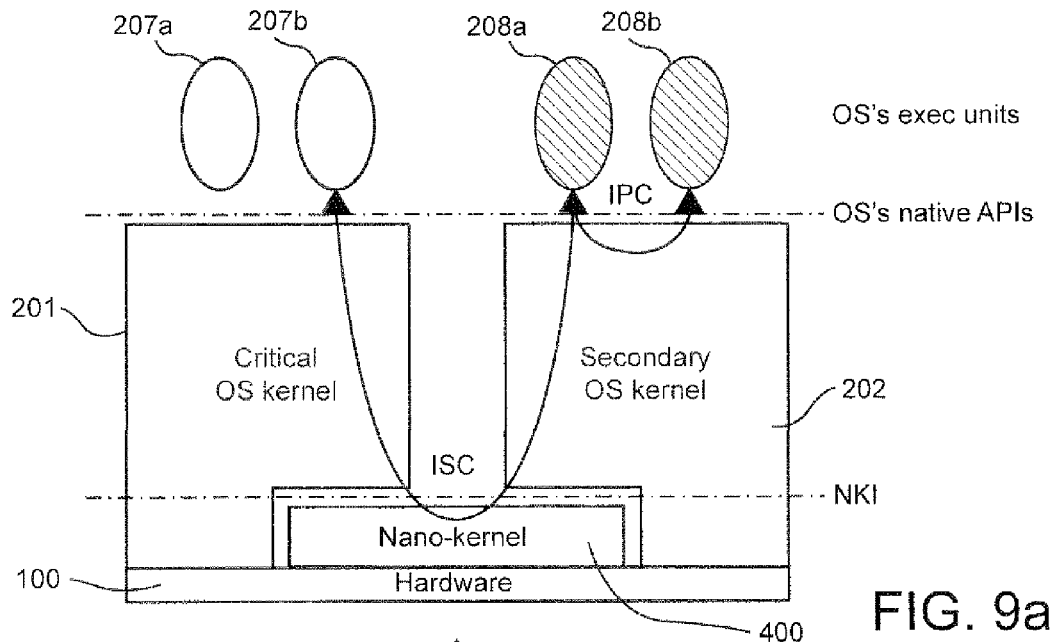
Figure 9B:
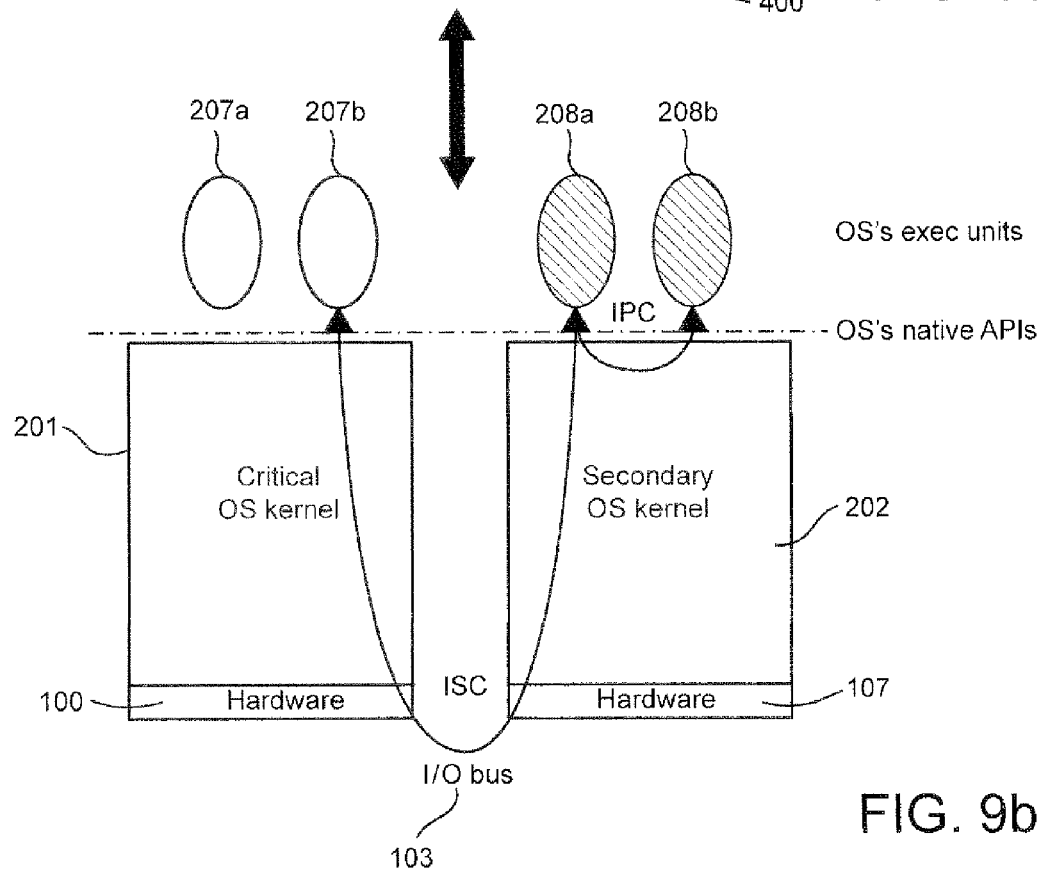
Figure 10:
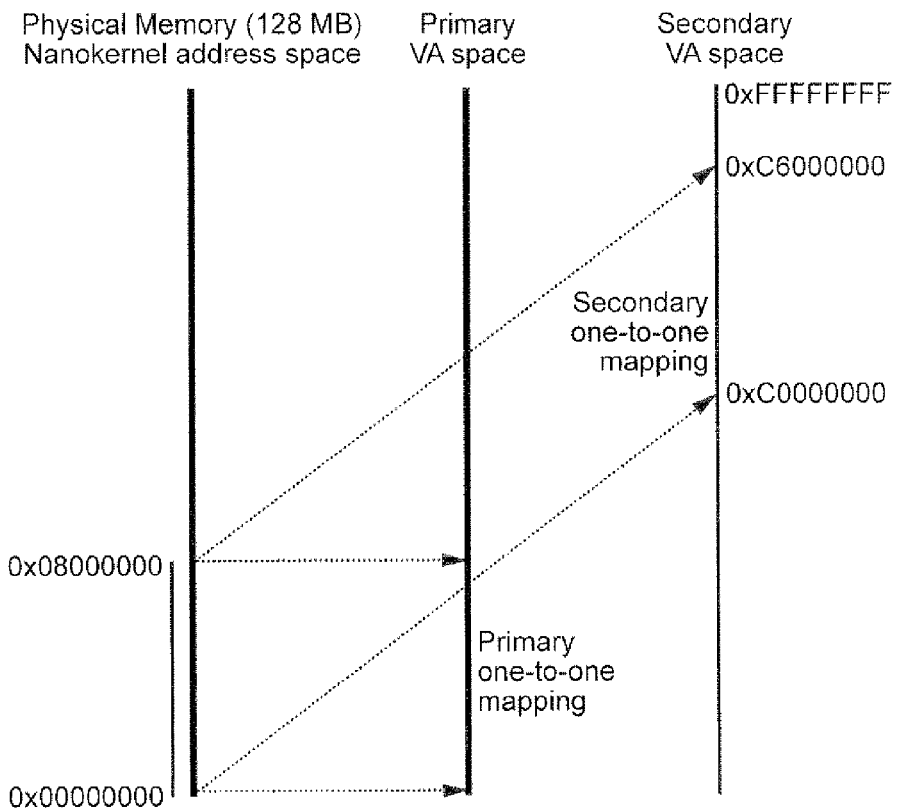

Embodiments of the invention will now be described, by way of example only, with reference to the accompanying drawings, in which:

FIG. 1 is a block diagram showing the elements of a computer system on which the present invention can execute;

FIG. 2a is a diagram illustrating the arrangement of software in the prior art; and FIG. 2b is the corresponding diagram illustrating the arrangement of software according to the present embodiment;

FIG. 3 is a flow diagram showing the stages in creating the software of FIG. 2b for the computer of FIG. 1;

FIG. 4 shows the components of a hardware resource despatcher forming part of FIG. 2b;

FIG. 5 illustrates the program used in a boot and initialisation sequence;

FIG. 6 illustrates the system memory image used in the boot or initialisation process;

FIG. 7 illustrates the transition from a primary operating system to a secondary operating system;

FIG. 8 illustrates the transition from a secondary operating system to a primary operating system;

FIG. 9a illustrates the communication between applications running on different operating systems according to the invention;

FIG. 9b illustrates the communication between applications running on different operating systems on different computers according to the invention;

FIG. 10 shows an example of the primary, secondary and nanokernel virtual address spaces.

Figure 11:
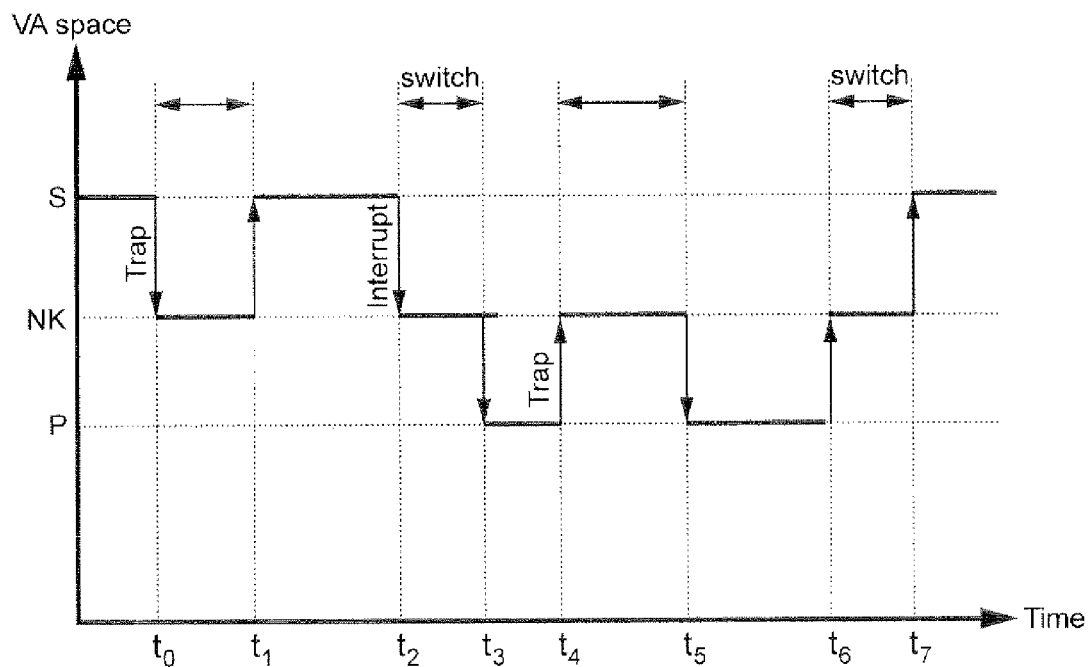
Figure 12:
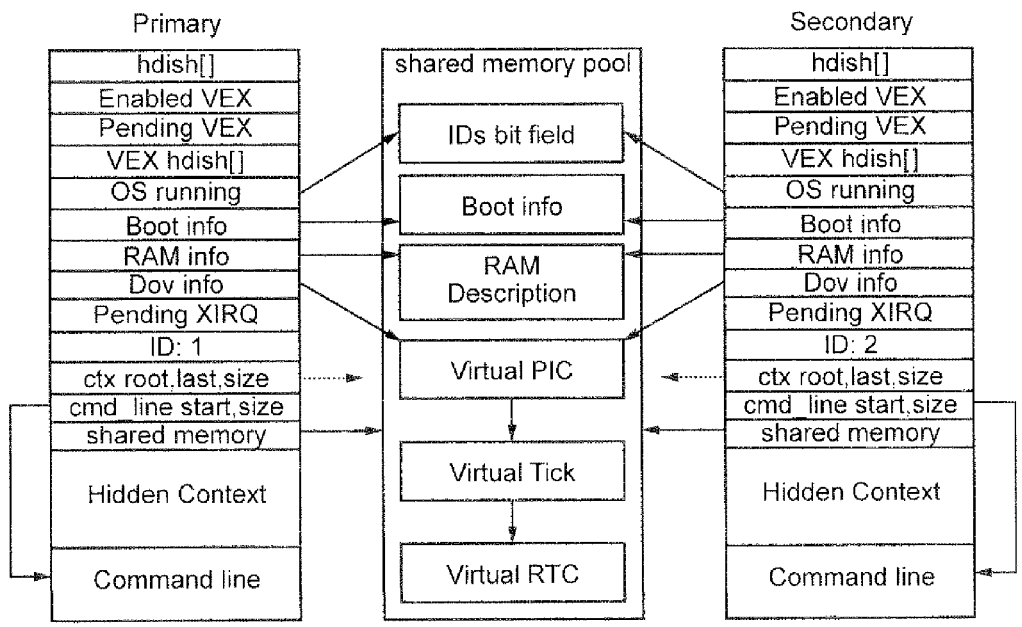
Figure 13:
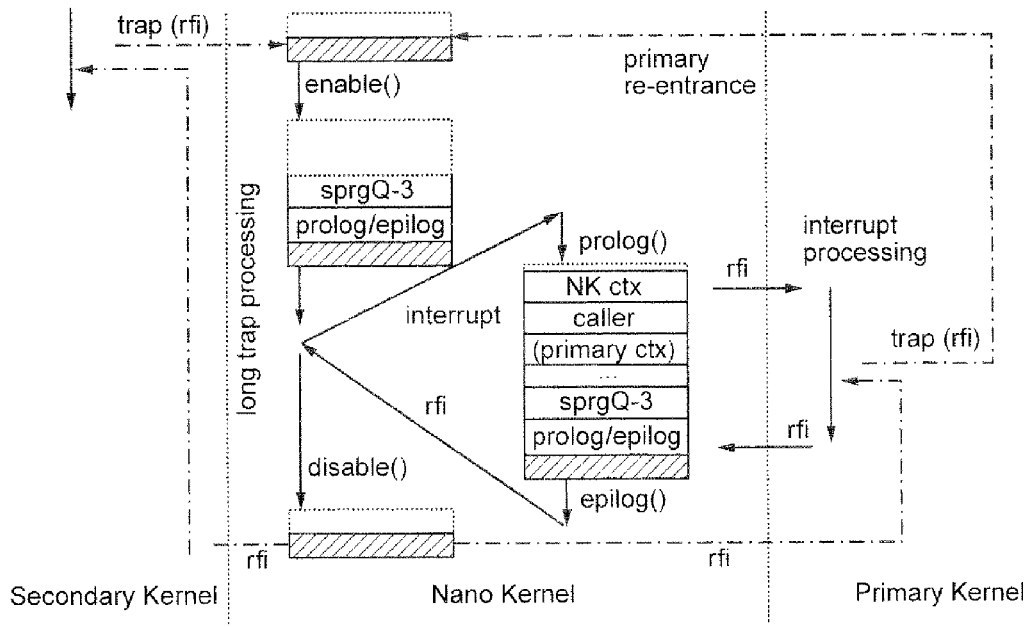
Figure 14:
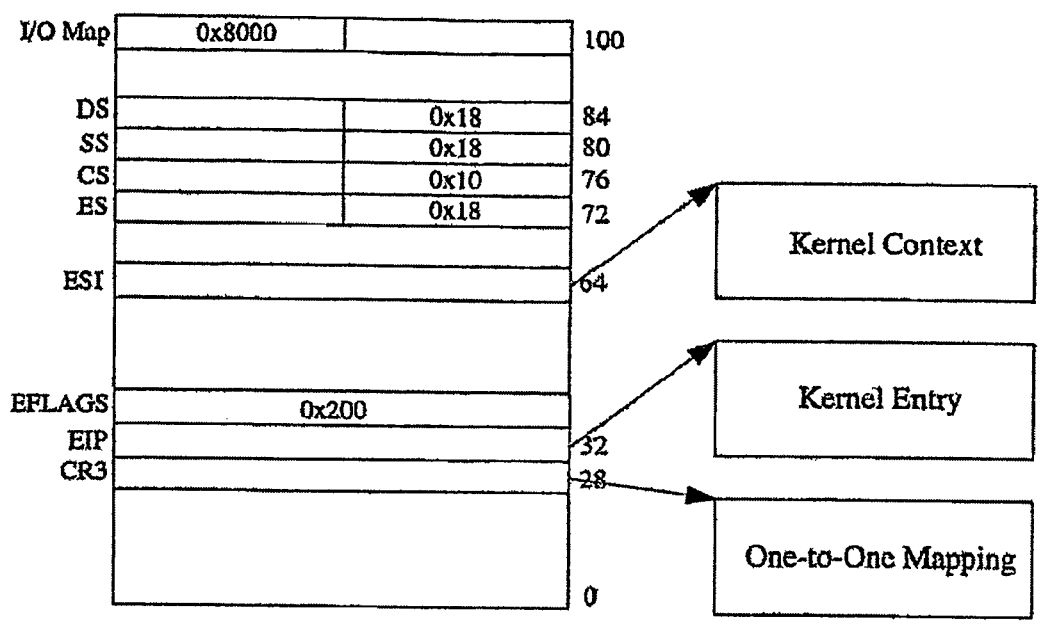
Figure 15:
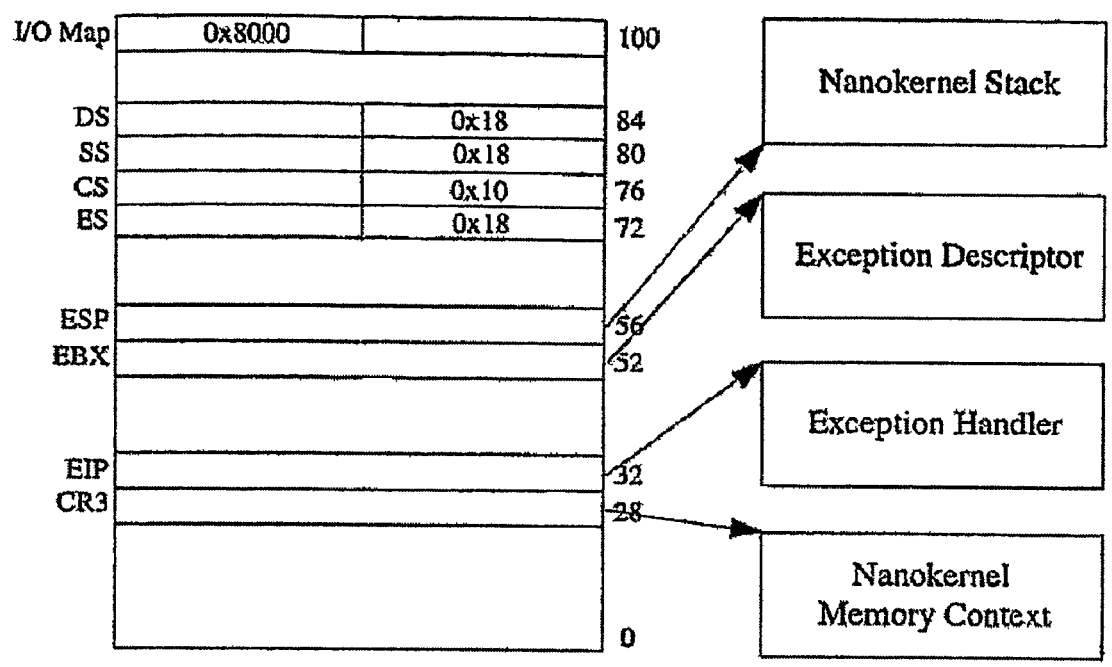
Figure 16:
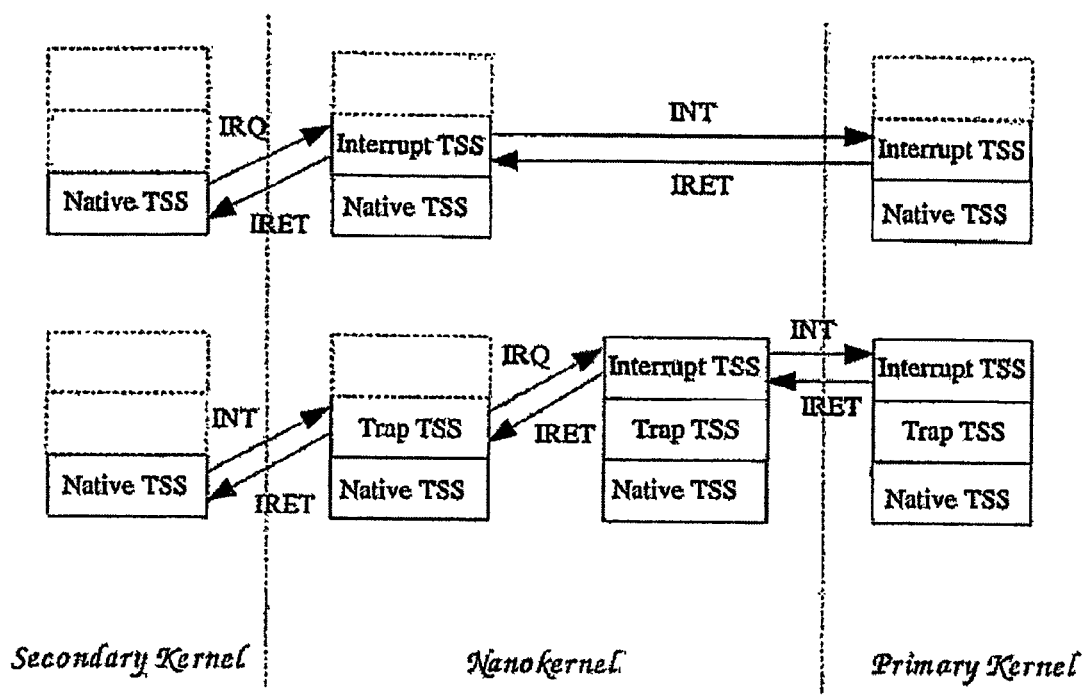
Figure 17:
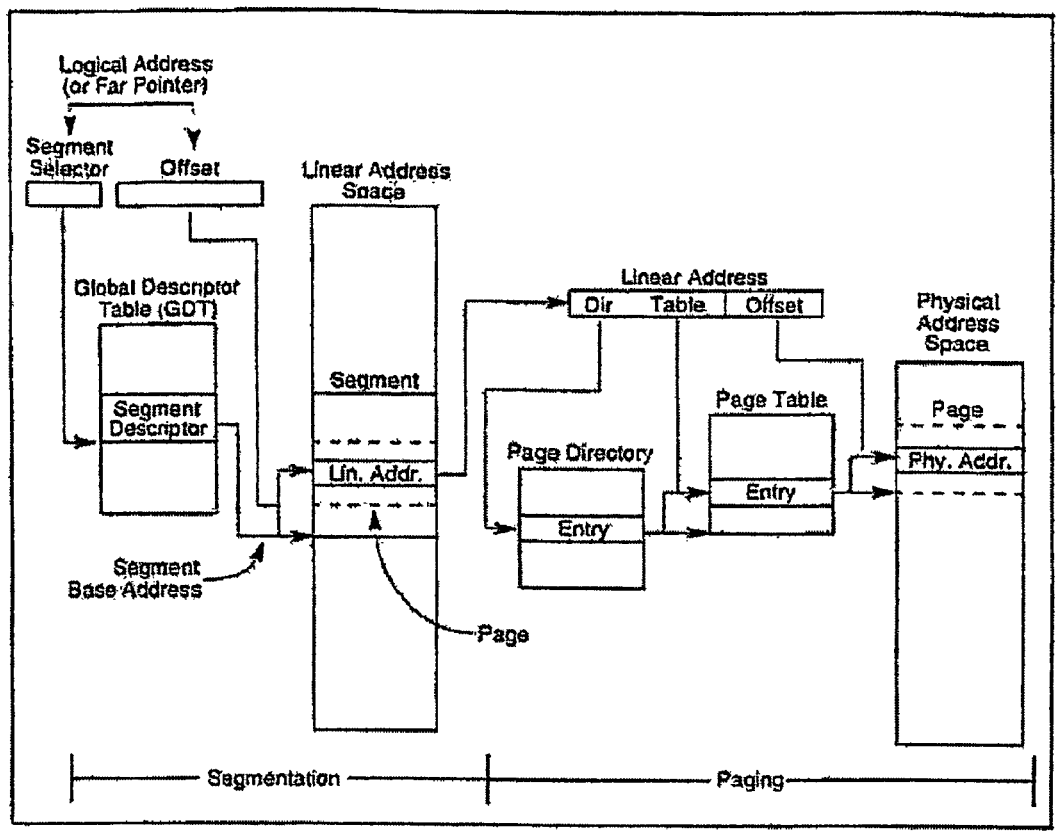
Figure 18:
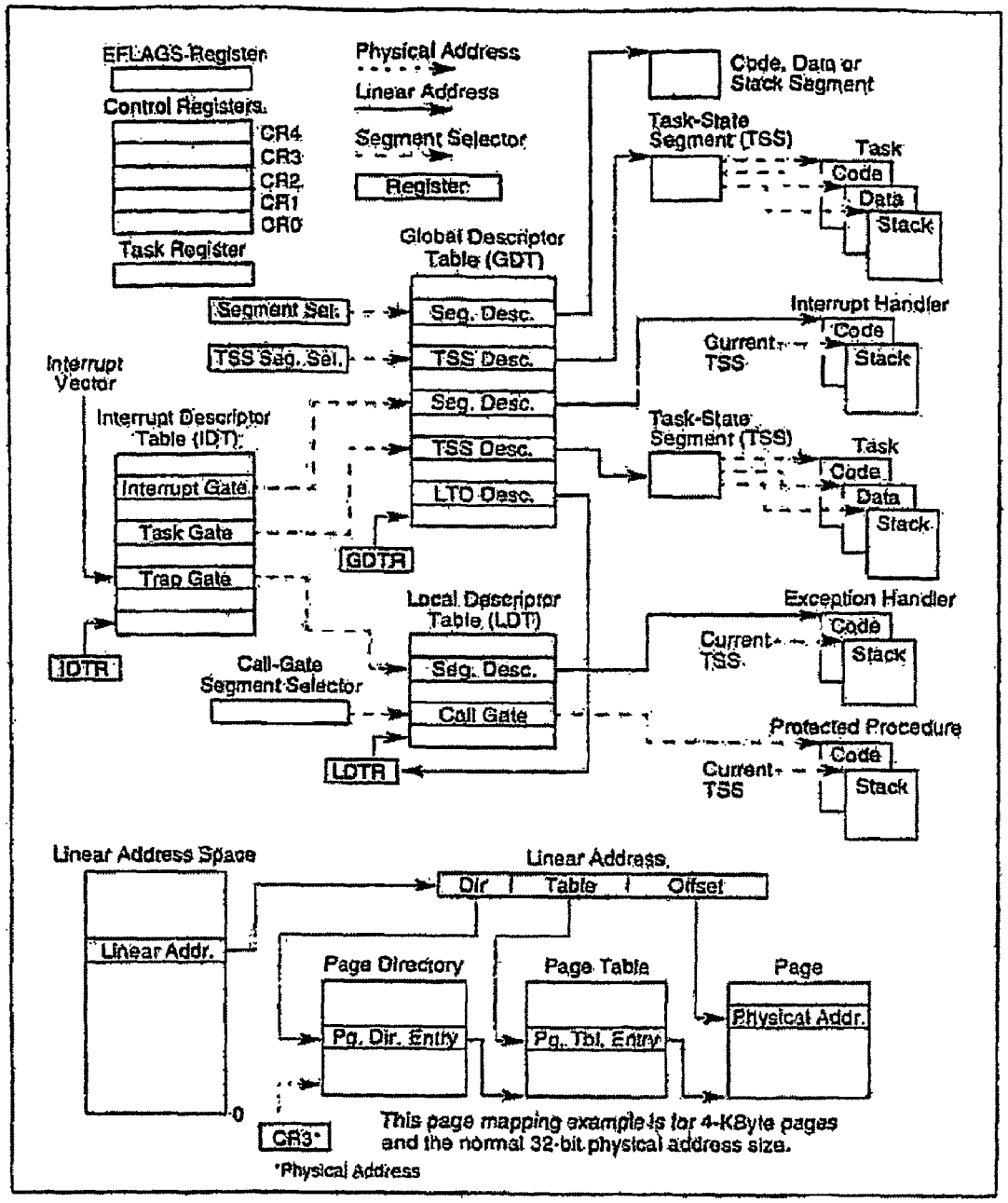

FIG. 11 shows how the memory context is switching in time;

FIG. 12 illustrates the visible part of the nanokernel context;

FIG. 13 illustrates the hidden part of the nanokernel context;

FIG. 14 shows how an initial TSS is initialized prior to the task switching;

FIG. 15 shows non zero fields of a nanokernel TSS;

FIG. 16 shows typical states of a TSS stack;

FIG. 17 shows how segmentation and paging are used in memory addressing in the Intel architecture; and FIG. 18 shows the system-level registers and data structures in the Intel architecture.

DETAILED DESCRIPTION OF EXEMPLARY EMBODIMENTS

System Hardware

A computer system to which the system is applicable 100 comprises a central processing unit (CPU) 102, such as a Pentium 4™ CPU available from Intel Corporation, or PowerPC CPU available from Motorola (the embodiment has been implemented on both), coupled via a system bus 104 (comprising control, data and address buses) to a read-only memory (ROM) chip 106; one or more banks of random access memory (RAM) chips (108); disk controller devices 110 (for example, Integrated Device Electronics (IDE) or Small Computer System Interface (SCSI) controllers, connected to a floppy disk drive, a hard disk drive, and additional removable media drives such as Digital Versatile Disc (DVD) drives); one or more input/output ports (112) (for example, one or more Universal Serial Bus (USB) port controllers, and/or parallel port controllers for connection to printer and so on); an expansion bus 114 for bus connection to external or internal peripheral devices (for example, the Peripheral Component Interconnect (PCI) bus); and other system chips 116 (for example, graphics and sound devices). Examples of computers of this type are personal computers (PCs) and workstations. However, the application of the invention to other computing devices such as mainframes, embedded microcomputers in control systems, and Personal Digital Assistants (PDAs) (in which case some of the indicated devices such as disk drive controllers may be absent) is also disclosed herein.

Management of Software

Referring to FIG. 2a, in use, the computer 100 of FIG. 1 runs resident programs comprising operating system kernel 202 (which provides the output routines allowing access by the CPU to the other devices shown in FIG. 1); an operating system user interface or presentation layer 204 (such as X Windows); a middleware layer 206 (providing networking software and protocols such as, for instance, a Transmission Control Protocol/Internet Protocol (TCP/IP) stack) and applications 208a, 208b, which run by making calls to the Application Programming Interface (API) routines forming the operating system kernel 202.

The operating system kernel has a number of tasks, in particular:

scheduling (i.e., sharing the CPU and associated resources between different applications which are running);

memory management (i.e. allocating memory to each task, and, where necessary, swapping data and programs out of memory add on to disk drives);

providing a file system;

providing access to devices (typically, through drivers);

interrupt handling;

providing an applications programming interface enabling the applications to interact with system resources and users.

The kernel may be a so-called "monolithic kernel" as for Unix, in which case the device drivers form part of the kernel itself. Alternatively, it may be a "microkernel" as for Chorus, in which case the device drivers are separate of the kernel.

In use, then, when the computer 100 is started, a bootstrap program stored in ROM 106 accesses the disk controllers 110 to read the file handling part of the operating system from permanent storage on disk into RAM 108, then loads the remainder of the operating system into an area of RAM 108. The operating system then reads any applications from the disk drives via the disk controllers 110, allocates space in RAM 108 for each, and stores each application in its allocated memory space.

During operation of the applications, the scheduler part of the operating system divides the use of the CPU between the different applications, allowing each a share of the time on the processor according to a scheduling policy. It also manages use of the memory resources, by "swapping out" infrequently used applications or data (i.e. removing them from RAM 108 to free up space, and storing them on disk).

Finally the routines making up the applications programming interface (API) are called from the applications, to execute functions such as input and output, and the interrupt handling routines of the operating system respond to interrupt and events.

Summary of Principles of the Preferred Embodiment

In the preferred embodiment, each operating system 201, 202 to be used on the computer 100 is slightly re-written, and a new low-level program 400 (termed here the "hardware resource dispatcher", and sometimes known as a "nanokernel" although it is not the kernel of an operating system) is created. The hardware resource dispatcher 400 is specific to the particular type of CPU 102, since it interacts with the processor. The versions of the operating systems which are modified 201, 202 are also those which are specific to the hardware, for reasons which will become apparent.

The hardware resource dispatcher 400 is not itself an operating system. It does not interact with the applications programs at all, and has very limited functionality. Nor is it a virtual machine or emulator; it requires the operating systems to be modified in order to cooperate, even though it leaves most of the processing to the operating systems themselves, running their native code on the processor.

It performs the following basic functions:

loading and starting each of the multiple operating systems;

allocating memory and other system resources to each of the operating systems;

scheduling the operation of the different operating systems (i.e. dividing CPU time between them, and managing the change over between them);

providing a "virtualised device" method of indirect access to those system devices which need to be shared by the operating systems ("virtualising" the devices);

providing a communications link between the operating systems, to allow applications running on different operating systems to communicate with each other.

The operating systems are not treated equally by the embodiment. Instead, one of the operating systems is selected as the "critical" operating system (this will be the real time operating system), and the or each other operating system is treated as a "non-critical" or "secondary" operating system (this will be the or each general purpose operating system such as Linux).

When the hardware resource dispatcher is designed, it is provided with a data structure (e.g. a table) listing the available system resources (i.e. devices and memory), to enable as many system devices as possible to be statically allocated exclusively to one or other of the operating systems.

For example, a parallel printer port might be statically allocated to the general purpose operating system 202, which will often run applications which will need to produce printer output. On the other hand, an Integrated Services Digital Network (ISDN) digital line adapter port may be permanently allocated to the real time operating system 201 for communications. This static allocation of devices wherever possible means that each operating system can use its existing drivers to access statically allocated devices without needing to call the hardware resource dispatcher. Thus, there is no loss in execution speed in accessing such devices (as there would be if it acted as a virtual machine or emulator).

In the case of system devices which must be shared, the hardware resource dispatcher virtualises uses of the devices by the non-critical operating systems, and makes use of the drivers supplied with the critical operating system to perform the access. Likewise, for interrupt handling, the interrupts pass to the critical operating system interrupt handling routines, which either deal with the interrupt (if it was intended for the critical operating system) or pass it back through the hardware resource dispatcher for forwarding to a non critical operating system (if that was where it was destined).

On boot, the hardware resource dispatcher is first loaded, and it then loads each of the operating systems in a predetermined sequence, starting with the critical operating system, then following with the or each secondary operating system in turn. The critical operating system is allocated the resources it requires from the table, and has a fixed memory space to operate in. Then each secondary operating system in turn is allocated the resources and memory space it requires from the available remaining resources.

Thus, according to the embodiment, the resources used by the operating systems are separated as much as physically possible, by allocating each its own memory space, and by providing a static allocation of devices exclusively to the operating systems; only devices for which sharing is essential are shared.

In operation, the hardware resource dispatcher scheduler allows the critical operating system to operate until it has concluded its tasks, and then passes control back to each non critical operating system in turn, until the next interrupt or event occurs.

The embodiment thus allows a multi operating system environment in which the operation of the critical operating system is virtually unchanged (since it uses its original drivers, and has first access to any interrupt and event handling). The secondary operating systems are able to operate efficiently, within the remaining processor time, since in most cases they will be using their own native drivers, and will have exclusive access to many of the system devices. Finally, the hardware resource dispatcher itself can be a small program, since it handles only limited functions, so that system resources are conserved.

The preferred embodiment is also economic to create and maintain, because it involves only limited changes to standard commercial operating systems which will already have been adapted to the particular computer 100. Further, since the changes to the operating systems are confined to architecture specific files handling matters such as interrupt handling, and configuration at initialising time, which interface with the particular type of computer 100, and which are unlikely to change as frequently as the rest of the operating system, there may be little or no work to do in adapting new versions of the same operating system to work in a multiple operating system fashion.

DETAILED DESCRIPTION OF THE PREFERRED EMBODIMENT

In this embodiment, the computer 100 is an Intel 386 family processor (e.g. a Pentium processor) (step 302). The critical operating system 201 was the C5 operating system (the real time microkernel of Jaluna-1, an open-source version of the fifth generation of the ChorusOS system, available for open source.

In step 306, the ChorusOS operating system kernel 201 is modified for operating in multiple operating system mode, which is treated in the same way by porting to a new platform (i.e. writing a new Board Support Package to allow execution on a new computer with the same CPU but different system devices). The booting and initialisation sequences are modified to allow the real time operating system to be started by the hardware resource dispatcher, in its allocated memory space, rather than starting itself. The hardware-probing stage of the initialisation sequence is modified, to prevent the critical operating system from accessing the hardware resources which are assigned to other secondary systems. It reads the static hardware allocation table from the hardware resource dispatcher to detect the devices available to it.

Trap calls are added to the critical operating system, to detect states and request some actions in response. A trap call here means a call which causes the processor to save the current context (e.g. state of registers) and load a new context. Thus, where virtual memory addressing is used, the address pointers are changed. For example, when the real time operating system 201 reaches an end point and ceases to require processor resources) control can be passed back to the hardware resource dispatcher, issuing the "idle" trap call, to start the secondary operating system. Many processors have a "halt" instruction. In some cases, only supervisor-level code (e.g. operating systems, not applications) can include such a "halt" instruction. In this embodiment, all the operating systems are rewritten to remove "halt" instructions and replace them with an "idle" routine (e.g. an execution thread) which, when called, issues the "idle" trap call.

Some drivers of the Board Support Package are specially adapted to assist the hardware resource dispatcher in virtualizing the shared devices for secondary operating systems.

Additional "virtual" drivers are added which, to the operating system, appear to provide access to an input/output (I/O) bus, allowing data to be written to the bus. In fact, the virtual bus driver uses memory as a communications medium; it exports some private memory (for input data) and imports memory exported by other systems (for output data). In this way, the operating system 201 (or an application running on the operating system) can pass data to another operating system (or application running on it) as if they were two operating systems running on separate machines connected by a real I/O bus.

The secondary operating system 202 was selected (step 308) as Linux, having a kernel version 2.4.18 (step 308).

In step 310, the secondary operating system kernel 202 is modified to allow it to function in a multiple operating system environment, which is treated as new hardware architecture. As in step 306, the boot and initialisation sequences are modified, to allow the secondary operating system to be started by the hardware resource dispatcher, and to prevent it from accessing the hardware resources assigned to the other systems, as specified in the hardware resource dispatcher table. As in step 306, trap calls are added, to pass control to the hardware resource dispatcher.

Native drivers for shared system devices are replaced by new drivers dealing with devices which have been virtualized by the hardware resource dispatcher (interrupt controller, I/O bus bridges, the system timer and the real time clock). These drivers execute a call to virtual device handlers 416 of the hardware resource dispatcher in order to perform some operations on a respective device of the computer 100. Each such virtual device handler 416 of the hardware resource dispatcher is paired with a "peer" driver routine in the critical operating system, which is arranged to directly interact with the system device. Thus, a call to a virtual device handler is relayed up to a peer driver in the critical system for that virtualized device, in order to make real device access. As in step 306, read and write drivers for the virtual I/O bus are provided, to allow inter-operating system communications.

The interrupt service routines of the secondary operating system are modified, to provide virtual interrupt service routines each of which responds to a respective virtual interrupt (in the form of a call issued by an interrupt handler routine 412 of the hardware resource dispatcher), and not to respond to real interrupts or events. Routines of the secondary operating system (including interrupt service routines) are also modified to remove masking of hardware interrupts (at least in all except critical operations). In that way, the secondary operating systems 202, . . . are therefore pre-emptable by the critical operating system 201; in other words, the secondary operating system response to a virtual interrupt can itself be interrupted by a real interrupt for the critical operating system 201. This typically includes: masking/unmasking events (interrupts at processor level); saving/restoring events mask status; identifying the interrupt source (interrupt controller devices); masking/unmasking interrupts at source level (interrupt controller devices).

New virtual device drivers are added, for accessing the shared hardware devices (the 1/0 bus bridges, the system console, the system timer and the real time clock). These drivers execute a call to virtual device handlers 416 of the hardware resource dispatcher in order to write data to, or read data from, a respective device of the computer 100.

To effect this, the Linux kernel is modified in this embodiment by adding new virtual hardware resource dispatcher architecture sub trees (nk-i386 and nk-ppc for the I-386 and PowerPC variants) with a small number of modified files. Unchanged files are reused in their existing form. The original sub-trees are retained, but not used.

In step 312, the hardware resource dispatcher 400 is written. The hardware resource dispatcher comprises code which provides routines for the following functions (as shown in FIG. 4):

booting and initialising itself (402);
storing a table which stores a list of hardware resources (devices such as ports) and an allocation entry indicating to which operating system each resource is uniquely assigned;
booting and initialising the critical operating system that completes the hardware resource dispatcher allocation tables (404);
booting and initialising secondary operating systems (406);
switching between operating systems (408);
scheduling between operating systems (410);
handling interrupts (using the real time operating system interrupt service routines, and supplying data where necessary to the virtual interrupt service routines of the secondary operating systems) (412);
handling trap calls from each of the operating systems (414);
handling access to shared devices from the secondary operating systems (416);
handling inter-operating system communications on the virtual I/O bus (418).

In further embodiments (described below), it may also provide a system debugging framework.

Operating System Switcher 408

In order to switch from an operating system to another, the operating system switcher 408 is arranged to save the "context"—the current values of the set of state variables, such as register values—of the currently executing operating system; restore the stored context of another operating system; and call that other operating system to recommence execution where it left off. Where the processor uses segments of memory, and virtual or indirect addressing techniques, the registers or data structures storing the pointers to the current memory spaces are thus swapped. For example, the operating systems each operate in different such memory spaces, defined by the context including the pointer values to those spaces.

In detail, the switcher provides:
explicit switches (e.g. trap calls) from the currently running to the next scheduled operating systems, when the current becomes idle; and
implicit switches from a secondary operating system to the critical operating system, when a hardware interrupt occurs.

The switches may occur on a trap call or a real or virtual interrupt, as described below.

Scheduler 410

The scheduler 410 allocates each operating system some of the available processing time, by selecting which secondary operating system (if more than one is present) will be switched to next, after exiting another operating system. In this embodiment, each is selected based on fixed priority scheduling. Other embodiments allowing specification based on time sharing, or guaranteed minimum percentage of processor time, are also contemplated herein. In each case, however, the critical operating system is pre-empted only when in the idle state.

In further embodiments, the critical operating system may explicitly inform the scheduler 410 when it may be pre-empted, so as to allow all secondary operating systems some access to the CPU to perform tasks with higher priority then the tasks still running in critical system. Thus, in one example, the interrupt service routines of the critical operating system cannot be pre-empted, so that the critical operating system can always respond to external events or timing signals from the realtime clock, maintaining realtime operation.

Handling Virtualised Processor Exceptions

The hardware resource dispatcher is arranged to provide mechanisms to handle processor exceptions (e.g. CPU interrupts or co-processor interrupts) as follows:

firstly, to intercept processor exceptions through the critical operating system;

secondly, to post a corresponding virtual exception to one or more secondary operating systems; to store that data and, when the scheduler next calls that secondary operating system, to call the corresponding virtual interrupt service routine in the secondary operating system;

thirdly, to mask or unmask any pending virtual exceptions from within secondary operating systems.

Virtualised exceptions are typically used for two different purposes;

Firstly, to forward hardware device interrupts (which are delivered as asynchronous processor exceptions) to secondary operating systems;

Secondly, to implement inter-operating system cross-interrupts—i.e. interrupts generated by one system for another interrupts (which are delivered as synchronous exceptions).

Trap Call Handler 414

The operation of the trap call handler will become apparent from the following description. Its primary purpose is to allow the scheduler and switcher to change to another operating system when a first one halts (and hence does not require CPU resources). An additional role is to invoke hardware resource dispatcher services such as a system console for use in debugging as discussed in relation to later embodiments.

Virtualised devices 416

As indicated above, for each shared device (e.g. interrupt controller, bus bridges, system timer, realtime clock) each operating system provides a device driver, forming a set of peer-level drivers for that device. The realtime operating system provides the driver used to actually access the device, and the others provide virtual device drivers.

The shared device handler 416 of the hardware resource dispatcher provides a stored data structure for each device, for access by all peer device drivers of that device. When the device is to be accessed, or has been accessed, the device drivers update the data stored in the corresponding data structure with the details of the access. The peer drivers use cross-interrupts (as discussed above) to signal an event to notify other peer drivers that that the data structure has just been updated.

The drivers which are for accessing interrupt controller devices use the virtualised exception mechanisms discussed above to handle hardware interrupts as follows:

The critical operating system device driver handles hardware interrupts and forwards them as virtualised exceptions to the secondary peer drivers;

The secondary operating system enables and disables interrupts by using the virtualised exception masking and unmasking routines discussed above.

I/O buses and their bridges only have to be shared if the devices connected to them are not all allocated to the same operating system. Thus, in allocating devices, to the extent possible, devices connected to the same I/O bus are allocated to the same operating system. Where sharing is necessary, the resource allocation table 404 stores descriptor data indicating the allocation of the resources on the bus (address spaces, interrupt lines and I/O ports) to indicate which operating system has which resources.

Implementation of the Embodiment

Finally, in step 314, the code for the hardware resource dispatcher and operating systems is compiled as a distributable binary computer program product for supply with the computer 100.

A product which may be supplied in accordance with an aspect of the invention is a development environment product, comprising a computer program which enables the user to select different operating systems to be used, build and select different applications for each operating system, embed the application and operating systems into a deliverable product, and provide for booting of the operating system and launch of executable binaries of the applications. This is based on, and similar to, the C5 development environment, available from www.jaluna.com.

Operation of the Embodiment During Booting and Initialisation

Referring to FIG. 5, the boot and initialisation processes according to this embodiment are performed as follows:

A bootstrapping program ("trampoline") 4022 stored in the ROM 106 is executed when power is first supplied, which starts a program 4024 which installs the rest of the hardware resource dispatcher program 400 into memory, and starts it, passing as an argument a data structure (as described below) describing the system image configuration.

The hardware resource dispatcher initialises a serial line which may be used for a system console. It then allocates memory space (an operating system environment) for each operating system in turn, starting with the critical operating system. The hardware resource dispatcher therefore acts as a second level system kernel boot loader.

Each operating system kernel then goes through its own initialisation phase, selecting the resources to be exclusive to that operating system within those remaining in the resource allocation table 404, and starting its initial services and applications.

FIG. 6 illustrates an example of a memory address allocation forming the system image. A position within memory is allocated when the hardware resource dispatcher and operating systems are compiled. The set of these positions in memory defines the system image, shown in FIG. 6. The system image comprises a first bank of memory 602 where the hardware resource dispatcher is located; a second bank of memory 604 where the real time operating system is located; a third bank of memory 606 where the secondary operating system is located; and, in this embodiment, a fourth bank of memory 608 where the RAM disk containing a root file system of the secondary operating system (Linux) is located.

This system image is stored in persistent storage (e.g. read only memory for a typical real time device such as a mobile telephone or Private Branch Exchange (PBX)). The remaining banks of memory are available to be allocated to each operating system as its environment, within which it can load and run applications.

Allocation of Memory for Operating System Context

Whilst being booted, each operating system then allocates a complementary piece of memory in order to meet the total size required by its own configuration. Once allocated to an operating system, banks of memory are managed using the physical memory management scheme of the operating system itself. All other memory is ignored by the operating system.

Virtual Memory Allocation

Each operating system is allocated separate virtual memory spaces, to make sure that operating systems cannot interfere with each other or with the hardware resource dispatcher. The User address spaces (i.e. ranges) and Supervisor address space (i.e. range) of each of the operating systems is each allocated a different memory management unit (MMU) context identifier (ID), which allow the differentiation of different virtual memory spaces having overlapping addresses. The MMUs context IDs are assigned to each operating system at the time it is compiled (step 314 of FIG. 3).

This solution avoids the need to flush translation cashes (TLBs) when the hardware resource dispatcher switches between different operating systems, which would take additional time. Instead, the switch over between different operating systems is accomplished by storing the MMU context IDs of the currently function operating system, and recalling the previously stored MMU context IDs of the switched two operating system.

Allocation of Input/Output Devices

As indicated above, the allocation table 404 indicates which devices are allocated uniquely to each operating system. In addition, table 404 indicates which input/output resources (Direct Memory Access (DMA) devices, input/output ports, interrupts and so on) are allocated exclusively to such devices, thus allowing a direct use of these resources without any conflict. Typically, many devices are duplicated, so it is possible to reduce potential conflicts substantially in this way.

The distribution is based on the operating system configuration scheme (for example, in the case of C5, the devices specified in the device tree). They are allocated to operating systems at boot time, and in order of booting, so that the critical operating system has first choice of the available devices in the table 404 and the secondary operating systems in turn receive their allocation in what remains. As each operating system initialised, it detects the presence of these devices and uses its native drivers for them without interaction from the hardware resource dispatcher.

"Hot" Reboot of Secondary Operating System

According to the present embodiments, it is possible to reboot a secondary operating system (for example because of a crash) whilst other operating systems continue to run. Because of the separation of system resources, a crash in the secondary operating system does not interfere with the ongoing operation of the critical operating system (or other secondary operating systems) and the rebooting of that secondary operating system does not do so either.

In the embodiment, the system "stop" and "start" trap calls to the hardware resource dispatcher assist in shutting down and restarting the secondary operating systems from within the critical operating system. Additionally, the hardware resource dispatcher saves a copy of the original system image, at boot time, in persistent memory within the hardware resource dispatcher allocated memory. As an example, hot restart in this embodiment is managed as follows:

At the time of initially booting up, the hardware resource dispatcher saves a copy of the secondary operating systems memory image.

The critical operating system includes a software watchdog driver routine for periodically monitoring the functioning of the secondary operating systems (for example, by setting a timeout and waiting for an event triggered by a peer driver running in the secondary operating systems so as to check for their continued operation).

If the critical operating system detects that the secondary operating system has failed or stopped, it triggers "stop" and then "start" trap calls (of the secondary operating system) to the hardware resource dispatcher.

The hardware resource dispatcher then restores the saved copy of the secondary operating system image, and reboots it from memory to restart. It was found that, on tests of an embodiment, the Linux secondary operating system could be rebooted within a few seconds from locking up.

In other respects, the hot restart builds upon that available in the Chorus operating system, as described for example in:

"Fast Error Recovery in CHORUS/OS. The Hot-Restart Technology)." Abrossimov, F. Hermann., J. C. Hugly, et al., Chorus Systems Inc., Technical Report, August 1996, 14 p.

Run-Time Operation

The operation of the embodiment after installation and booting will now be described in greater detail.

Having been booted and initialised, the real time operating system is running one or more applications 207 (for example a UDP/IP stack—UDP/IP stands for Universal Datagram Protocol/Internet Protocol) and the secondary operating system is running several applications 208*a*, 208*b* (for example a word processor and a spreadsheet). The real time operating system microkernel 201 and the secondary operating system kernel 202 communicate with the hardware resource dispatcher through the hardware resource dispatcher interface which comprises:

a data structure representing the operating system context (i.e. the set of state variables which need to be saved and restored in order to switch to the operating system), and the hardware repository;

the set of functions which execute in the operating system environment; and the set of trap call routines which execute in the hardware resource dispatcher environment.

If neither operating system requires processor time (for example, both have reached "wait" states) then the hardware resource dispatcher 400 switches to the critical operating system's idle thread, in which it waits an interrupt or event. Thus, interrupts can be processed immediately by the critical operating system's servicing routines, without needing to switch to the critical operating system first.

At some point, an interrupt or event will occur. For example, a packet may be received at a data port, causing an interrupt to allow it to be processed by the real time operating system executing the UDP/IP stack. Alternatively, a user may manipulate a keyboard or mouse, causing an interrupt to operate the Graphical User Interface (GUI) of the second operating system 202 for interaction with the word processing application 208. Alternatively, the system clock may indicate that a predetermined time has elapsed, and that an application should commence re-execution, or an operating system function should execute.

The critical operating system servicing routine then services the interrupt, as described below.

Interrupt and Event Handling

If not already in the critical operating system, the hardware resource dispatcher interrupt handler 412 calls the operating system switcher 408 to switch to the critical operating system, and then the interrupt handler routine 412 to call an interrupt service routine (ISR) in the critical operating system 201. If the interrupt is intended for the critical operating system, either because it is from a device uniquely assigned to the critical operating system or because it is from a shared device and has a certain predetermined value, the critical operating system ISR takes the action necessary to handle the interrupt. If not, control is passed back to the hardware resource dispatcher.

Critical to Secondary Operating Systems Switch

Referring to FIG. 7, for this example, the system is executing a thread 702 of an application 207*a* running on the critical operating system 201.

If an interrupt occurs, a critical operating system interrupt service routine 704 performs interrupt servicing. On termination, control passes back to the thread 702 and any others executed by the scheduler of the critical operating system 201. When processing of all threads is complete, the critical operating system has finished executing, it schedules its "idle" thread. Accordingly the "idle" trap routine in the critical operating system issues an "idle" trap call to the hardware resource dispatcher 400. The hardware resource dispatcher then executes a routine which does the following:

- If the interrupt handler 412 currently has, some stored virtual interrupts, these are forwarded by the interrupt handler 412 to the secondary operating system.
- The hardware resource dispatcher operating system scheduler 410 selects the secondary operating system 202 to execute. The OS switcher 408 then saves the current context (typically, processor MMU and status registers, instruction and stack pointers) in the critical OS context storage area 706. It then retrieves the stored execution context 708 for the secondary operating system 202, and writes them to the registers concerned.
- If there are virtual interrupts for the secondary OS concerned, the interrupt handler 412 calls the relevant interrupt service routine 710 within the secondary operating system, which services the interrupt and then, on completion, reverts to the execution of a thread 712 of the secondary operating system where it left off.

If the interrupt handler 412 currently has no pending interrupts, then the hardware resource dispatcher operating switcher 408 causes the secondary operating system to recommence execution where it left off, using the stored program counter value within the restored operating system context, in this case at the thread 712.

Thus, after the critical operating system 201 has performed some function (either servicing its own applications or services, or servicing an interrupt intended for another operating system), the hardware resource dispatcher passes control back to the next secondary operating system 202, as determined by the scheduler 410.

Secondary to Critical Operating System Switch on Interrupt

Referring to FIG. 8, the process of transferring from the secondary operating system to the critical operating system will now be disclosed. In this case, the system is executing a thread 712 of an application 208a running on the critical operating system 202.

When a hardware interrupt occurs, the hardware resource dispatcher starts the OS switcher, to save the secondary operating system context in the context storage area 708. It then switches to the primary operating system 201, restoring the values of state variables from the context storage area 706, and calls the interrupt service routine 704 of the primary operating system 201. After servicing the interrupt, the scheduler of the primary operating system 201 may pass control back from the ISR 704 to any thread 704 which was previously executing (or thread to be executed).

When the ISR and all threads are processed, the primary operating system 201 passes control back to the hardware resource dispatcher, which switches from the primary operating system 201 (saving the state variables in the context storage 706) and switches to a selected secondary operating system 201 (retrieving the state variables from the context storage 708), in the manner discussed with reference to FIG. 7 above.

Inter-Operating System Communications—Virtual Bus 418

The virtual bus routine cooperates with the virtual bus drivers in each operating system. It emulates a physical bus connecting the operating systems, similar to Compact PCI (cPCI) boards plugged into a cPCI backplane. Each operating system is provided with a driver routine for the virtual bus bridge device on this virtual bus, allowing the operating systems and their applications to communicate by any desired protocol, from raw data transfer to a full IP protocol stack.

The hardware resource dispatcher virtual bus is based on shared memory and system cross interrupts principles already discussed above. In detail, the virtual bus routine 418 emulates the C5 buscom DDI: syscom which defines virtual bus bridge shared devices, allowing the export (sharing) of memory across the virtual bus and triggering of cross-interrupts into other operating systems.

Each virtual bus driver, in each secondary operating system, creates such a virtual bus bridge in the hardware resource dispatcher hardware repository at startup time. By doing so, it exports (shares) a region of its private memory, and provides a way to raise interrupts within its hosting system.

Thus, a virtual bus driver of a first operating system sends data to a second operating system by:

- writing into the memory exported by a peer virtual bus driver of the second operating system, and then;
- triggering a cross-interrupt to notify that data are available to the peer bus driver in the second operating system.

In the reverse (incoming) direction, the virtual bus driver propagates incoming data up-stream (for use by the application or routine for which it is intended) when receiving a cross-interrupt indicating that such data have been stored in its own exported memory region.

Referring to FIG. 9a, an application 208a which is to communicate with another 208b running on the same operating system 202 can do so through that operating system. An application 207b running on one operating system 201 which is to communicate with another 208b running on a different operating system 202 does so by writing data to the virtual bus using the API of its operating system, which uses the virtual bus driver routine to pass the data to the other operating system 202, which propagates it from its virtual bus driver to the application 208b.

Referring to FIG. 9b, the changes necessary to migrate this arrangement to one in which the first and second operating systems run on different computers 100 are small; it is merely necessary to change the drivers used by the operating systems, so that they use drivers for a real bus 103 rather than the virtual bus drivers. The system is therefore made more independent of the hardware on which it operates.

Communication across the hardware resource dispatcher virtual bus is available to applications, but can also be used internally by the operating system kernels, so that they can cooperate in the implementation of services distributed among multiple operating systems. "Smart" distributed services of this kind include software watchdog used for system hot restart (discussed above), or a distributed network protocol stack.

Debugging

In a preferred embodiment, the hardware resource dispatcher has a second mode of operation, in which it acts as a debugging agent.

According to this embodiment, in the second mode, the hardware resource dispatcher can communicate via a serial communications line with debugging software tools running on another machine (the "host" machine).

Such debugging tools provide a high level graphical user interface (GUI) to remotely control the hardware resource dispatcher. The hardware resource dispatcher virtualised exception mechanism is used to intercept defined exceptions. The user can then configure and control how the hardware resource dispatcher behaves in case of processor exceptions, and also display machine and system states, to enable diagnosis of code or other system errors or problems.

The user can select one or more such processor exceptions as the basis for a trap call from an operating system to the hardware resource dispatcher. On the basis of the selected exception, when the or each exception occurs during execution, the operating system is stopped, and executes the trap call to the hardware resource dispatcher, which then saves the current context and enables interaction with the debugging tools on the host. The user can then cause the display of the current states of the state variables (such as the stack pointers, program and address counters) and/or the content of selected block of memory. The user can specify either that a given type of exception should be trapped in a specific operating system to be debugged, or that they should be trapped whenever they occur, in any operating system. In response, the trap call is implemented in just one, or in all, operating systems. The user can also specify if a given type of exception is to be normally forwarded to the system when restarting execution or simply ignored.

Because the hardware resource dispatcher executes in its own environment, it is able to debug much more of an operating system than could be done from within that system. Importantly, no code is shared between the hardware resource dispatcher acting as a debug agent and the systems being debugged. This allows, for example, the debugging of even kernel low level code such as exception vectors or interrupt service routines.

Some other aspects of the overall (host/target) debugging architecture according to this embodiment are similar to those for the Chorus and C5 debugging systems, described in the document "C5 1.0 Debugging Guide" published by Jaluna.

Secure Architecture

It will be clear that the embodiments described above give a firm basis for a secure architecture. This is because the secondary operating system, on which a user will typically run insecure applications, is insulated from specified system resources, and accesses them only through the hardware resource despatcher (and the drivers of the primary operating system). Thus, security applications can be run on the primary operating system which, for example, perform encryption/decryption; allow access to encrypted files; manage, store and supply passwords and other access information; manage and log access and reproduction of copyright material. Applications running on the secondary operating system cannot access system resources which are not allocated to that operating system, and where the operating systems run in different memory contexts (i.e. use different addressing pointers to different spaces) applications running on the secondary operating system cannot be used to interfere with those operating on the primary system so as to weaken the security of its operations.

Intel Architecture Embodiment Features

In the following, the hardware resource despatcher is described (in a non-limiting sense) as a nanokernel. This section focuses on IA-32 Intel specific aspects of the nanokernel implementation, in particular, on the nanokernel executive which is the corner stone of the nanokernel environment.

It describes how the IA-32 Intel processor architecture is used in order to implement the nanokernel executive which is capable to run multiple independent operating systems concurrently sharing the central and floating-point processor units (CPU and FPU) as well as the memory management unit (MMU) across these operating systems.

It also describes how the nanokernel executive handles the hardware interrupts. In particular, it describes the mechanism used to intercept and forward hardware interrupts toward the primary operating system and the software interrupts mechanism provided to the secondary operating systems.

Note that we assume that the nanokernel is running on a uniprocessor computer and therefore aspects related to the symmetrical multi-processor (SMP) architecture is not addressed here.

Overview

Virtual Address Spaces

On IA-32 Intel architecture nanokernel always runs in a virtual address space, in order words, the MMU is always enabled. On the other hand, the memory context in which the nanokernel code is executing may vary in time.

In this description the memory context term designates an IA-32 address translation tree which root directory table is specified by the CR3 register.

Typically, an operating system supporting user mode processes creates multiple memory contexts (one per user process) in order to be able to handle private user virtual address spaces. The kernel changes the memory context each time it switches from one user process to another. On the other hand, together with the user address spaces, the operating system kernel also handles the unique supervisor address space replicated in all memory contexts. User and supervisor virtual addresses never overlap on IA-32 Intel architecture.

The supervisor address space mappings may be either static or dynamic. The static mapping is created at system initialization time and it typically maps (entirely or partially) available physical memory. Such mapping also called the one-to-one or kernel virtual (KV) mapping. In particular, the KV mapping usually covers the kernel code, data and bss sections. Dynamic mappings are created at run time in order to access dynamically loaded kernel modules or dynamically allocated (non contiguous) memory chunks.

Three kinds of memory context are distinguished in the nanokernel environment: primary, secondary and nanokernel.

The primary memory context is a memory context currently used by the primary kernel. Note that, in case the primary operating system supports user address spaces, there might be multiple memory contexts used by the primary kernel but, as was already mentioned above, the supervisor address space is identical in all such contexts. Because the nanokernel does not care about user mappings, the primary memory context is unique from the nanokernel perspective and it consists in static and dynamic supervisor mappings established by the primary kernel.

The secondary memory context is a memory context currently used by the secondary kernel. Once more, in case the secondary operating system supports user address spaces, there might be multiple memory contexts used by the secondary kernel but the supervisor address space is still identical in all such contexts. Because the nanokernel is only aware about the static KV mapping established by the secondary kernel, the secondary memory context is unique from the nanokernel perspective (for a given secondary kernel) and it consists of such a one-to-one mapping. It is important to note that the nanokernel requires accessibility through the static KV mapping to secondary kernel data used by the nanokernel. Such data structures are listed in further sections describing the nanokernel interface to the secondary kernel.

The nanokernel memory context is build by the nanokernel itself. This context reproduces all KV mappings established by the primary as well as by all secondary kernels. In order to be able to create such a memory context, the nanokernel requires compatibility of all KV mappings. Two KV mappings are compatible if and only if they either do not overlap or are identical.

Note that when running multiple identical secondary kernels, their KV mappings are naturally identical, and therefore compatible. The problem may however occur when the primary operating system is different from the secondary one. In this case, it might be necessary to modify one of the system to obtain the KV mappings compatibility.

The nanokernel memory context is mainly used to execute the nanokernel code when a secondary kernel is preempted by an interrupt, trap or exception event handled by the nanokernel, for example, in order to perform an I/O operation to the nanokernel console. The nanokernel memory context is also used as an intermediate address space allowing to switch from a secondary execution environment to the primary one and vise versa.

The nanokernel binary takes a place in the primary KV mapping and the nanokernel code is executing either in the primary or in the nanokernel memory context. In other words, the nanokernel code is executing in place in the one-to-one mapping defined by the primary kernel. When the nanokernel preempts the primary kernel, the nanokernel code is executing in the primary memory context. When the nanokernel preempts a secondary kernel, the nanokernel code is executing in the nanokernel context which replicates the primary KV mapping. Note that in general there are no restrictions on primary data used by the nanokernel because the nanokernel operations called by the primary kernel are executed in the primary memory context and therefore the primary supervisor address space is directly accessible. On the other hand, the nanokernel requires accessibility through the static KV mapping to some primary kernel data used by the nanokernel during the switch to/from a secondary kernel. Such data structures are listed in further sections describing the nanokernel interface to the primary kernel.

FIG. 10 shows an example of the primary, secondary and nanokernel virtual address spaces.

In this example the physical memory size is 128 megabytes. The primary kernel uses the trivial one-to-one (KV) mapping starting from zero (like C5 microkernel) and the secondary kernel uses a shifted one-to-one (KV) mapping starting from 0xc0000000 (like Linux kernel). These KV mappings are compatible and the nanokernel address space maps the physical memory twice reproducing both one-to-one mappings.

FIG. 11 shows how the memory context is switching in time. Initially, a secondary operating system is running in a secondary memory context. At t0 time, the current secondary kernel traps to the nanokernel in order to output a character to the nanokernel console. This trap switches the current memory context to the nanokernel one. During the [t0,t1] period, the nanokernel (running in the nanokernel memory context) prints out a character to the nanokernel console. At t1 time, the nanokernel returns to the secondary kernel switching back to the secondary memory context. At t2 time an interrupt occurs while running the secondary operating system. The interrupt switches the current memory context to the nanokernel one and invokes the nanokernel interrupt handler. In order to forward the interrupt to the primary kernel, the nanokernel switches from the nanokernel memory context to the primary one and invokes the primary interrupt handler at t3 time. During the interrupt request processing, at t4 time, the primary kernel invokes the nanokernel write method in order to output a message on the nanokernel console. Note that this is an simple indirect call which does not switch the memory context and the write operation is entirely executed in the primary memory context.

At t5 time, the nanokernel returns from the write method to the primary kernel which continue the interrupt request processing until the t6 time. At this moment, the primary kernel returns from the interrupt handler and the nanokernel switches back to the interrupted secondary operating system in order to continue its execution. Such a switch starts in the primary memory context and, going through the intermediate nanokernel context, finally ends up in the secondary memory context at t7 time.

Nanokernel Invocation and Preemption

The nanokernel is invoked either explicitly trough a function call/trap or implicitly through an interrupt/exception handler. In the former case, we say that an operating system kernel invokes the nanokernel. In the latter case, we say that the nanokernel preempts an operating system. It is important to underline that the nanokernel is always invoked from the privileged code running in the supervisor address space. On the other hand, the nanokernel may preempt as the kernel itself as well as an user process running under kernel control.

Once the system is booted, the nanokernel is activated first and it starts execution of the primary and secondary kernels. Once the initialization phase is done, the nanokernel plays a passive role. This means that the code executed in the nanokernel is driven by the primary and secondary kernels explicitly invoking the nanokernel (by call or trap) or by externally generated synchronous (i.e., exceptions) and asynchronous (i.e., interrupts) events.

On IA-32 Intel architecture, mechanisms used for the nanokernel invocation and preemption are different for primary and secondary operating systems. In terms of execution environment, the nanokernel is quite closed to the primary kernel. It uses the same memory context and, sometimes, the same supervisor stack. Thus, the nanokernel has roughly the same availability as the primary kernel. On the other hand, there is a barrier between the secondary operating systems and nanokernel providing some protections against the secondary kernel malfunction. Note however that such a protection is not absolute and a secondary kernel is still able to crash the primary kernel as well as the nanokernel.

Primary Invocation

The primary kernel invokes the nanokernel by a simple indirect call. The memory context is not switched by invocation.

Primary Preemption

The nanokernel preempts the primary operating system through an interrupt gate. The memory context is not switched by preemption and the native primary supervisor stack is used to handle the preemption.

The nanokernel preempts the primary operating system only in rare cases. One of them is the device not available exception (#NM) used by the nanokernel to handle the FPU sharing between kernels in a lazy fashion as described further in this document.

Secondary Invocation

A secondary kernel invokes the nanokernel by a trap. The nanokernel intercepts such a trap by a task gate which switches to the nanokernel memory context and starts the trap task execution.

Secondary Preemption

The nanokernel preemption of a secondary operating system is similar to the invocation mechanism and is based on task gates. When a secondary system is preempted by an interrupt or exception, the corresponding task gate switches to the nanokernel memory context and starts execution of the corresponding nanokernel task.

Kernel Context

The nanokernel data can be split on two categories: the global and per-kernel data. The global data keeps the global nanokernel state (e.g., the nanokernel memory context) while the per-kernel data keeps a state associated with a given primary or secondary kernel. The per-kernel data is also called the kernel context.

The kernel context consists of two parts: visible and hidden. The visible part is public and takes a part in the nanokernel interface. This part of the kernel context is described in detail in further sections related to the nanokernel interface. The hidden part is not visible to kernels and is used internally by the nanokernel executive.

Nanokernel Executive Interface

This chapter describes the nanokernel executive interface exported to the primary and secondary kernels. Such an interface consists in a data shared between a kernel and the nanokernel (i.e., visible kernel context) as well as the nanokernel methods. Note that the nanokernel interface is kernel role specific and is (strictly saying) different for the primary and secondary kernels. On the other hand, there is a quite significant intersection between these two interfaces which can be described independently from the kernel role.

Visible Kernel Context

FIG. 12 illustrates the visible part of the kernel context.

All kernel contexts (primary as well as secondaries) are linked in a circular list. The next field refers to the next kernel context within such a list. Note that, in the visible part of the kernel context, all references are made through physical addresses. A kernel has to convert such a physical address to the virtual one (from the KV mapping) in order to access the referenced object. The picture shows a configuration with only two kernels: primary and secondary. The primary context points to the secondary one which, in turn, points back to the primary context.

The pending VEX and enabled VEX fields reflect the current state of the virtual exceptions. Note that these fields are meaningless for the primary context because the primary kernel exceptions are not virtualized by the nanokernel. The virtualized exceptions mechanism is described in detail further in this document together with the secondary kernel execution model.

The boot info field points to the boot parameters given by BIOS. This field is read-only.

Note that such a data structure is kernel specific and therefore it is also located in the kernel context. Among other fields, the boot parameters structure points to the boot command line specifying the boot time parameters. Such parameters are ether given to the boot loader (e.g., GRUB boot loader) or passed through the nanokernel environment. The command line is kernel specific and it is located in the kernel context as well. The nanokernel parses the initial command line in order to create kernel specific command lines containing only parameters related to the corresponding kernel.

The RAM info field points to the RAM description table. This field is read-only. The RAM description table is a global data structure shared by all kernels. It describes how the RAM resource is distributed across the kernels.

The dev info field points to the list of virtual devices abstracted by the nanokernel. This field is read-only for a secondary kernel and read-write for the primary one. The devices list is global and it is shared by all kernels. Each virtual device in the list is represented by a data structure specified by the nanokernel. This data structure is typically accessed by both primary and secondary peer drivers using rules defined by the nanokernel. The primary peer driver plays a server role supporting the virtual device while the secondary peer driver plays a client role using the virtual device instead of the real one. This list is created (and modified) by the primary kernel only. A secondary kernel is only allowed to browse this list.

The pending XIRQ field specifies pending cross interrupts. This field is not used by the nanokernel itself. It is hosted by the context structure in order to assist to the primary and secondary kernels in the cross interrupts exchange. There is only one exception dedicated to the cross interrupt delivery. The pending XIRQ field allows to extend the number of cross interrupts up to 32 (one bit per cross interrupt source). A cross interrupt bit is set by the source kernel (i.e., the kernel which sends cross interrupt) and it is reset by the destination kernel (i.e., the kernel which receives the cross interrupt).

The ID field contains a unique kernel identifier. This field is read only. Identifier 0 is assigned to the nanokernel itself and identifier 1 is assigned to the primary kernel. The kernel identifier designates the kernel in the nanokernel interface. For example, the kernel identifier is used to tag resources assigned to a given kernel (e.g., memory chunks in the RAM description table).

The running field is a flag specifying the kernel state: running or halted. This field is read only. The nanokernel sets this flag before launching the kernel and clears it once the kernel is halted. When a kernel is restarted, the running flag is first cleared and then set. Any kernel is able to browse the circular list of kernel contexts and to analyze the running flag in order to find out all running peer kernels. Note that the running flag is always set for the primary kernel.

The final part of the visible kernel context is role specific.

The primary context specifies addresses of the nanokernel interface methods. The primary kernel uses these addresses in order to invoke the nanokernel through an indirect function call. The methods addresses are set up by the nanokernel and they must not be modified by the primary kernel. The nanokernel interface methods are described in detail in the next section.

The secondary kernel uses the trap mechanism to invoke the nanokernel rather than an indirect call. So, addresses of the nanokernel interface methods are not present in the secondary context. Instead, the secondary context has a secondary TS bit field which keeps the TS bit state of the CR0 register. Such a software image of the TS bit may be used by the secondary kernel in order to manage the FPU resource in a lazy way as described in detail further in this document.

Nanokernel Methods

The nanokernel provides two groups of methods: the console I/O operations and the executive operations. The console I/O group allows a kernel to send/receive characters to/from the nanokernel console serial line. This document does not specially address the console I/O methods which are more or less generic but rather it is focused on the executive methods which are IA-32 Intel architecture specific.

Basically, the nanokernel environment replaces some IA-32 Intel processor instructions with the nanokernel methods. Such substituted instructions typically load or store some IA-32 Intel processor registers:

Global Descriptor Table Register (GDTR)
Interrupt Descriptor Table Register (IDTR)
Task Register (TR)
Load/Store GDT Register (LGDT/SGDT)

Instead of loading/storing directly to/from the GDT register via the IA-32 lgdt/sgdt instructions, in the nanokernel environment, a kernel has to invoke the lgdt/sgdt nanokernel methods to do so. These methods are similar for the primary and secondary kernels except that they are indirect calls for the primary kernel and traps for the secondary ones.

Similar to the processor instructions, the lgdt/sgdt nanokernel methods take only one parameter specifying a 6-byte memory location that contains the native table base address (a virtual address) and the native table limit (size of table in bytes). It is important to underline that the native GDT must always be located within the KV mapping (even for the primary kernel).

The nanokernel manages a per-kernel global descriptor table. This (real) table resides in the hidden part of the kernel context shown on FIG. 13. Together with the real GDT, the nanokernel keeps a pointer to the native GDT which is given to the nanokernel via the lgdt method. The nanokernel initializes the real GDT from the native one by copying the segment descriptors. Note however that a part of the real GDT is reserved for the nanokernel segments. The nanokernel handles a bit string specifying a mapping between the native and real tables. For each entry in the real table, the mapping specifies whether the entry is used for a nanokernel segment, or it is inherited from the native table and therefore contains a copy of the corresponding kernel segment. The real entries used for the nanokernel segments are not updated by the lgdt method.

The nanokernel segments are located at the end of the real table which default size is 256 entries. When porting a kernel to the nanokernel architecture, an overlap between the kernel and nanokernel segments should be avoided by either rearranging kernel segments within the native table (moving them to the beginning of the table) or increasing the real GDT size.

Load/Store IDT Register (LIDT/SIDT)

Instead of loading/storing directly to/from the IDT register via the IA-32 lidt/sidt instructions, in the nanokernel environment, a kernel has to invoke the lidt/sidt nanokernel methods to do so. These methods are similar for the primary and secondary kernels except that they are indirect calls for the primary kernel and traps for the secondary ones.

Similar to the processor instructions, the lidt/sidt nanokernel methods take only one parameter specifying a 6-byte memory location that contains the native table base address (a virtual address) and the native table limit (size of table in bytes). It is important to underline that the native IDT must always be located within the KV mapping (even for the primary kernel).

The nanokernel manages a per-kernel interrupt descriptor table. This (real) table resides in the hidden part of the kernel context shown on FIG. 13. Together with the real IDT, the nanokernel keeps a pointer to the native IDT which is given to the nanokernel via the lidt method. The nanokernel initializes the real IDT from the native one by copying the gate descriptors.

Note that the nanokernel can install its own gate in the real table in order to intercept an exception. For example, the nanokernel intercepts the device not available exception (#NM) in order to manage the FPU sharing in a lazy fashion. So, similar to GDT, the nanokernel handles a bit string specifying a mapping between the native and real tables. For each entry in the real table, the mapping specifies whether the entry is installed with a nanokernel gate, or it is inherited from the native table and therefore contains a copy of the corresponding kernel gate. The real entries installed with the nanokernel gates are not updated by the lidt method.

The real table size must be equal to or greater than the native table size. If this requirement is not meet when porting a kernel to the nanokernel architecture, either the real table size has to be increased or the native table size has to be reduced.

Load Task Register (LTR)

Instead of loading directly to the task register via the IA-32 ltr instruction, in the nanokernel environment, a kernel has to invoke the ltr nanokernel method to do so. This method is similar for the primary and secondary kernels except that it is an indirect call for the primary kernel and a trap for the secondary ones.

Similar to the processor instruction, the ltr nanokernel method takes only one parameter specifying a segment selector that points to a task state segment (TSS). It is important to underline that the TSS pointed out by the segment selector must be always located within the KV mapping (even for the primary kernel).

Idle

The nanokernel provides an idle method which has to be called by a kernel within an idle loop. The idle method is equivalent to the IA-32 Intel hlt instruction and it informs the nanokernel that the calling kernel has nothing to do until the next interrupt. This method is similar for the primary and secondary kernels except that it is an indirect call for the primary kernel and a trap for the secondary ones.

The idle method invocation results in a system switch to the next ready to run secondary kernel (if any) or in the return from the primary idle method when all secondary kernels are idle. The idle method has no parameter.

The primary idle method should be called with enabled processor interrupts and it always returns to the caller with disabled processor interrupts. So, once returned from the nanokernel idle method, the primary kernel is able to directly execute the IA-32 sti instruction followed by the IA-32 hlt instruction in order to suspend the processor until the next interrupt.

The secondary idle trap can be called with either enabled or disabled (software) interrupts and it always returns to the caller with enabled interrupts. In fact, the secondary idle trap implicitly enables interrupts and it returns to the caller once an interrupt has been delivered to this kernel as a virtual exception (VEX).

Restart

The nanokernel provides a restart method which can be called as by the primary as well as by a secondary kernel in order to restart a secondary kernel. This method is similar for the primary and secondary kernels except that it is an indirect call for the primary kernel and a trap for the secondary ones.

The method parameter specifies identifier of the kernel being restarted. The nanokernel stops the kernel execution, restores the kernel image from its copy and finally starts the kernel execution at the initial entry point.

Secondary Reboot

The reboot trap is provided by the nanokernel to a secondary kernel. Such a trap is called by a secondary kernel when it is rebooting. This trap is equivalent to the restart trap called on the kernel itself.

Secondary Halt

The halt trap is provided by the nanokernel to a secondary kernel. Such a trap is called by a secondary kernel when it is halted. The nanokernel puts the caller kernel into a non running state in order to avoid this kernel being switched in by the nanokernel scheduler.

A stopped kernel can be started again by the restart nanokernel method described above.

Primary Execution Environment

Basically, the primary kernel is executing in the native execution environment. The nanokernel implementation on IA-32 Intel processor tries to minimize impact of the nanokernel environment to the primary operating system characteristics (performance, interrupt latency, preemption latency). Because the primary operating system is typically a real-time operating system, it is important to keep the primary kernel behavior unchanged even if other (secondary) operating systems are running concurrently on the same processor.

Initialization

The nanokernel is started first by the boot loader with disabled MMU, i.e., in the physical space. Basically, the nanokernel initialization code installs the primary memory bank (containing the primary kernel code/data/bss sections) in the physical memory and jumps to the primary entry point.

Before jumping to the primary kernel, the nanokernel initializes the primary kernel context, and in particular, the real GDT and IDT to an initial state.

The initial primary GDT has only two valid entries specifying the nanokernel code and data segments. The selectors used for the kernel code and data segments are fixed by the nanokernel interface to 0x10 and 0x18 respectively. So, when porting a kernel to the IA-32 nanokernel architecture, the above code and data selectors have to be used.

All gates in the initial primary IDT as well as the task register are invalid (zeroed).

The nanokernel initialization code is executed using a static nanokernel stack located in the data section. When jumping to the primary kernel, this stack is still valid. Despite of that, the primary kernel should switch to its own stack as soon as possible and should never use this nanokernel stack in the future. The nanokernel stack is used not only at initialization phase but also at run time in order to handle secondary invocations and preemptions as described in the next chapter.

When jumping to the primary kernel, the % esi register points to the kernel context and the eflags register is cleared. So, processor interrupts are disabled at the beginning of the primary initialization phase. The primary kernel usually enables interrupts once a critical initialization phase is done.

During the initialization phase, the primary kernel typically invokes the nanokernel methods in order to setup the GDT, IDT and task registers. Finally the primary kernel enters in the idle loop and invokes the nanokernel idle method.

When the idle method is called first time, the nanokernel considers that the primary kernel has fully initialized its execution environment and it proceeds to the post initialization phase.

In such a post initialization phase, the nanokernel builds the nanokernel memory context and initializes the secondary kernel contexts as described in the next chapter. Note that the nanokernel memory context creation is deferred until the post initialization phase because it requires allocation of physical memory for building the translation tree but the available memory resource is discovered and registered by the primary kernel initialization code. Once the post initialization is done, the nanokernel calls the scheduler in order to either switch to a ready to run secondary kernel or return from the primary idle method if all secondary kernels are idle.

The nanokernel requires the primary kernel to initialize the globally shared data structures: the RAM descriptor and the virtual devices list. Such an initialization has to be done before the idle method is called. This requirement is natural because beyond this moment a secondary kernel can access the globally shared data structures.

In particular, the primary kernel is in charge to detect the physical memory available on the board and to register free physical memory chunks in the RAM descriptor.

According to the primary Board Support Package (BSP), the primary kernel should start nanokernel aware drivers which, in turn, should populate the virtual devices list. Such virtual devices are provided to secondary kernels and therefore they should be created before the first secondary kernel is started.

Intercepted Exceptions

Basically, the nanokernel does not intercept exceptions which occur when the primary operating system is running on the processor. All programming exceptions, traps and interrupts are handled by native primary handlers. The primary low-level handlers do not need to be modified when porting to the IA-32 Intel nanokernel architecture.

An exception from the above rule is programming exceptions related to the FPU emulation:

the invalid opcode exception (#UD)

the device not available exception (#NM)

The FPU emulation feature is used by the nanokernel to implement a lazy mechanism of FPU sharing as described further in this document.

Another special case is a debug agent which could be embedded in the nanokernel in order to provide a host based remote system debugging of the primary operating system. In this case, the debug agent usually intercepts some synchronous exceptions related either to debug features (e.g., single instruction trace) or to program errors (e.g., page fault) as described above in more general terms.

Forwarded Interrupts

When an interrupt occurs while a secondary operating system is running on the processor, the interrupt is forwarded to the primary operating system. Such an interrupt forwarding process goes through the following major steps:

the interrupt is intercepted by the nanokernel;

execution of the preempted secondary kernel is suspended and the nanokernel switches to the primary execution environment;

the nanokernel triggers the corresponding interrupt to the primary kernel using an itn instruction.

In such a way the corresponding primary low-level interrupt handler is invoked (in the primary execution environment) in order to process the interrupt. Once the interrupt is processed, the primary kernel returns to the nanokernel executing an fret instruction.

After returning from the primary interrupt handler, the nanokernel calls the scheduler in order to determine the next secondary operating system to run. Note that the preempted secondary system would not necessary be continued after interrupt. Another (higher priority) secondary system may become ready to run because of the interrupt.

Secondary Execution Environment

Basically, the secondary kernel execution environment is quite closed to the native one except for the interrupts management. The nanokernel environment modifies the native mechanism of the interrupts management in order to make a secondary operating system fully preemptable. A secondary kernel ported to the nanokernel architecture no more disables interrupts at processor level but rather uses a software interrupts masking mechanism provided by the nanokernel (i.e., virtual exceptions). Interrupts are no more directly processed by such a secondary kernel, but rather they are intercepted by the nanokernel, forwarded to the primary kernel and only then optionally processed by the secondary kernel in a deferred way.

Initialization

The nanokernel installs the secondary memory banks at initialization time together with primary banks. On the other hand, the final initialization of a secondary kernel, in particular the kernel context setup, is deferred until the post initialization phase.

At this phase, the nanokernel allocates memory to keep a copy of secondary memory banks. Such a copy is then used to restore the initial image of secondary system at restart time.

The secondary system restart is however optional and it might be disabled in order to reduce the physical memory consumption.

Analogous to the primary kernel, the nanokernel initializes the real GDT and IDT as well as the initial TSS located in the hidden part of the kernel context (see FIG. 13).

Similarly to the primary real GDT, the initial secondary real GDT has two valid entries specifying the nanokernel code and data segments. Segment selectors for the nanokernel code and data are assigned by the nanokernel interface to 0x10 and 0x18 respectively. In addition, the secondary real GDT contains descriptors specifying the nanokernel TSS data structures used by the nanokernel tasks. Such nanokernel tasks are used to intercept secondary exceptions as described in the next section. The nanokernel TSS descriptors are located at the end of the real GDT.

In the real IDT, the nanokernel installs task gates in order to intercept hardware interrupts and nanokernel traps. In order to be able to handle a fatal exception at secondary initialization time, all other exceptions are also temporarily intercepted by the nanokernel until a native IDT installed via the lidt nanokernel trap. If such an outstanding (fatal) exception occurs, the nanokernel simply halts the secondary kernel but it disturbs neither primary nor other secondary systems. Once a native IDT is installed, the initially used fatal exception gates are overridden by the native ones. Note however that it does not concerns the permanently intercepted exceptions described in the next section.

The nanokernel launches a secondary kernel executing a task switch to the initial TSS located in the secondary kernel context. FIG. 14 shows how an initial TSS is initialized prior to the task switching. Note that only non zero fields are shown on the picture while all zero fields are shadowed.

Analogous to the primary kernel, the kernel context physical address is passed on the %esi register. On the other hand, unlike the primary kernel, the interrupt flag (IF) is set in the processor flags field (EFLAGS) enabling processor interrupts even during the secondary kernel initialization phase. It should be noted that even the secondary kernel initialization code is fully preemptable by the primary system. This is particularly important in order to do not disturb the primary operating system when a secondary operating system is restarted.

Despite of enabled hardware interrupts, the virtual exceptions (corresponding to hardware interrupts) are disabled when a secondary kernel is started. So, interrupts are not delivered by the nanokernel until they are explicitly enabled by the kernel at the end of the critical initialization phase: The software interrupts masking mechanism (based on virtual exceptions) is described in detail further in this document. The CR3 field points to a one-to-one translation tree. Such an initial one-to-one mapping is temporarily provided to a secondary kernel. Note that this mapping should not be modified or permanently used by the initialization code, instead, the secondary kernel should build its own KV mapping and switch to it as soon as possible.

The stack pointer is invalid when a secondary kernel is started. Usually, the secondary kernel uses a static initial stack located in the data section in order to execute its initialization code.

Analogous to the primary kernel, during the initialization phase, a secondary kernel typically invokes the nanokernel traps in order to setup the GDT, IDT and task registers. Finally the secondary kernel enters in the idle loop and invokes the nanokernel idle trap.

Intercepted Exceptions

In order to intercept a secondary exception, the nanokernel installs a task gate to the corresponding entry of the real IDT. Thus, when such an exception occurs, the IA-32 Intel processor performs a task switch which saves the processor state to the current task state segment (TSS) and restores the processor state from the TSS specified by the exception task gate.

For each intercepted exception, the nanokernel creates a dedicated TSS data structure pointed out by a dedicated segment descriptor located in the real GDT. Such nanokernel segments (used to reference the nanokernel TSS data structures) are located at the end of the real GDT. All nanokernel TSS data structures are similarly initialized according to the nanokernel execution environment. FIG. 15 shows non zero fields of a nanokernel TSS. The zeroed part of the TSS data structure is shadowed on the figure.

The EIP field contains address of a nanokernel exception task. The EBX field points to an exception descriptor. Note that multiple intercepted exceptions can be multiplexed in the same nanokernel exception task. For example, the same task is used to intercept all hardware interrupts. In this case, such a multiplexed task can use the exception descriptor (available on the %ebx register) in order to obtain an exception specific information.

All intercepted exceptions can be classified according to its nature as interrupts, traps and programming exceptions (faults).

The nanokernel intercepts all hardware interrupts (including the non maskable interrupt (NMI)) in order to forward when to the primary kernel.

Traps intercepted by the nanokernel are, in fact, the following nanokernel invocations:
  generic trap
  XIRQ trap
  STI trap
  IRET trap The generic trap combines all non performance critical nanokernel invocations like console I/O, lgdt/sgdt, lidt/sidt, ltr, halt, reboot, restart. The nanokernel method number and arguments are passed on general purpose registers as for a conventional trap. The generic trap is handled by a common exception task which invokes nanokernel methods according to the number coded in the %eax register.

Other three traps are performance critical and they are handled by specific nanokernel tasks. These traps have no arguments.

The XIRQ trap sends a cross interrupt to the primary kernel. The XIRQ trap task is equivalent to the interrupt task except that the exception forwarded to the primary kernel corresponds to a software interrupt rather than to a hardware one. So, like an interrupt, the XIRQ trap preempts the current secondary kernel.

The STI and IRET traps both called by a secondary kernel in order to process pending virtual exceptions. These traps take a part in the software interrupts masking mechanism and they are described in detail in the next section dedicated to the virtual exceptions.

Analogous to the primary kernel, the nanokernel usually does not intercept programming exceptions except some special cases described below.

The nanokernel intercepts the following exceptions related to the FPU emulation:
  the invalid opcode exception (#UD)
  the device not available exception (#NM)

The FPU emulation feature is used by the nanokernel to implement a lazy mechanism of FPU sharing as described further in this document.

Another special case is a debug agent which could be embedded in the nanokernel in order to provide a host based remote system debugging of the secondary operating system. In this case, the debug agent usually intercepts some synchronous exceptions related either to debug features (e.g., single instruction trace) or to program errors (e.g., page fault). Such a debug agent design however is out of scope of this document.

Virtual Exceptions

Virtual exceptions (VEX) is a mechanism provided by the nanokernel which allows a kernel to post an exception to a secondary kernel and to deliver it in a deferred manner. In particular, the VEX mechanism is used in the IA-32 Intel nanokernel architecture in order to replace hardware interrupts with software ones for a secondary kernel.

The VEX interface consists in two field located in the kernel context: pending and enabled. These fields are meaningful only for a secondary kernel context but they are accessed by both the primary and secondary kernels. All virtual exceptions are naturally enumerated by the bit position in the pending (or enabled) field. So, there are in total 32 virtual exceptions supported by the nanokernel on the IA-32 Intel architecture (the pending and enabled fields are 32 bit integer values).

The table below shows how the virtual exceptions are mapped to the real ones:

| Virtual Exception | Real Exception | Description |
| --- | --- | --- |
| 0 | 2 | NMI |
| 1-16 | 32-47 | IRQ0-IRQ15 |
| 17 | 48 | Cross Interrupt |
| 18-30 | — | — |
| 31 | — | Running |

Virtual exceptions from 0 up to 16 are mapped to the hardware interrupts. The virtual exception 17 is mapped to the real exception 46 used to deliver cross interrupts to the secondary kernel. The virtual exceptions from 18 up to 30 are not currently used and they are reserved for future extensions. The virtual exception 31 does not correspond to any real exception and it is in fact a pseudo virtual exception which is used internally by the nanokernel in order to detect whether the kernel is idle. How such a pseudo virtual exception works is described in detail further in this document.

Because multiple virtual exceptions can be pending at the same time but only one of them can be processed at time, all virtual exceptions are prioritized according to its number. The highest priority is assigned to the NMI and the lowest priority is assigned to the Running pseudo exception.

The pending VEX field of a secondary context is typically updated by the primary kernel which provides a driver for the virtual PIC device. Such a driver usually posts virtual exceptions (interrupts) to secondary kernels by setting appropriate bits in the pending VEX field.

The enabled VEX field is updated by the secondary kernel in order to enable or disable virtual exceptions. A given virtual exception is enabled if the corresponding bit is set in the enabled VEX field. Using the enabled VEX field, a secondary kernel implements critical sections protected against interrupts. In other words, a secondary kernel no more uses the cli and sti A-32 instructions to disable/enable processor interrupts but rather modifies the enabled VEX field of its kernel context.

A given virtual exception is delivered by the nanokernel if it is pending and enabled simultaneously. The nanokernel resets the corresponding pending bit just before jumping to the secondary exception handler.

When delivering a virtual exception to a secondary kernel, the nanokernel interprets the gate descriptor from the native IDT. In order to minimize modifications in low-level handlers of a secondary kernel, the nanokernel calls the gate handler in the same state as the IA-32 Intel processor does. In other words, the nanokernel switches the stack pointer, the code and stack segments and pushes the exception frame into the supervisor stack in the same way as the IA-32 Intel hardware does.

Note however that, when porting a secondary kernel on the IA-32 nanokernel architecture, low-level exception handlers have still to be modified in order to take into account the software interrupts masking mechanism which substitutes the hardware one. When calling an interrupt gate handler, the nanokernel only disables all virtual exceptions writing 0x80000000 to the enabled field. The hardware interrupts are always enabled at processor level when running a secondary kernel and therefore a secondary kernel can be preempted by the primary one even inside a low-level interrupt gate handler. In such a way, in the nanokernel environment, a secondary operating system becomes fully preemptible by the primary operating system.

A virtual exception can be posted by the primary kernel while it is in disabled state. It this case, the exception is not delivered to the secondary kernel but it is rather kept pending until the exception is re-enabled again. So, when virtual exceptions are re-enabled by a secondary kernel, a check should be made whether any virtual exceptions are pending. If the check is positive, the secondary kernel should invoke the nanokernel in order to process such pending virtual exceptions. Such invocation is performed by means of either STI or WET trap.

In general, a secondary kernel re-enables virtual exceptions in two following cases:

when virtual exceptions has been previously disabled by the secondary kernel in order to protect a critical section of code;

when virtual exceptions has been disabled by the nanokernel as result of an interrupt gate invocation.

In the former case, the secondary kernel uses the STI trap to process pending virtual exceptions if any. Once pending exceptions are processed, the nanokernel will return from the STI trap in order to continue the secondary kernel execution.

In the latter case, the secondary kernel uses the IRET trap to process pending virtual exceptions when returning from the exception handler. Note that the IRET trap just substitutes the iret IA-32 instruction and when the trap is executed the exception frame is still pushed into the supervisor stack. Note also that the nanokernel does not return from the IRET trap, instead, once pending exceptions are processed, the secondary operating system execution is continued at the point it has been preempted by the initial virtual exception. In other words, the IRET trap returns to the state saved in the exception frame located at the top of stack at trap time.

Nanokernel Re-Entrance

The nanokernel code is mostly executed with interrupts disabled at processor level preventing re-entrance inkernel. On the other hand, some nanokernel invocations may take a long time and therefore the nanokernel has to enable interrupts when executing such long operations in order to keep the primary interrupt latency low.

There are three kinds of long nanokernel operations:
synchronous console output

The operation duration depends on the serial line speed. For example, on a 9600 baud rate line, a single character output may take up to 1 millisecond.

lgdt and lidt

The operation duration depends on the table size. These operations can still be done with disabled interrupts for the primary kernel because they are typically issued at initialization time when interrupts are usually disabled anyway. For the secondary lgdt and lidt methods however, it is clearly not acceptable to keep interrupts disabled because a secondary kernel can be restarted at any time.

secondary kernel restart

The operation duration depends on the kernel image size which is restored from a copy.

For all operations listed above, the nanokernel enables interrupts and therefore re-entrance from the primary kernel. On the other hand, while interrupts are enabled, the nanokernel scheduler is disabled in order to prevent another secondary kernel to be scheduled when returning from the primary interrupt handler. In other words, the nanokernel can be preempted by the primary kernel only (as result of an interrupt) but re-entrance from a secondary kernel is prohibited. Such a restriction allows the nanokernel to use global resources for the secondary execution environment. For example, TSS data structures used for intercepted exceptions are global and shared across all secondary kernels.

Some long operations issued from a secondary kernel can be executed in the primary memory context. In other words, before executing such an operation, the nanokernel switches to the primary execution context and then enables interrupts. Once the operation is done, the nanokernel disables interrupts and returns to the caller secondary kernel through the nanokernel scheduler.

Note however that some long operations cannot be executed in the primary memory context because they require access to data structures located in the secondary KV mapping. A typical example of such operations are secondary lgdt and lidt methods which access native GDT and IDT data structures respectively. So, these operations must be done in the nanokernel memory context.

Note also that it is preferable to execute frequently used nanokernel methods in the nanokernel memory context (even if they can be executed in the primary memory context as well) in order to avoid an extra overhead introduced by the switch to/from the primary execution environment. A typical example of such a frequent operation is a synchronous output on the nanokernel console.

The discussion above shows that the nanokernel must be capable to enable processor interrupts while executing code in the nanokernel memory context with activated secondary GDT and IDT. In other words, the nanokernel must support a task switch to the interrupt task while running the trap task executing a secondary nanokernel method.

In order to support such a tasks nesting, the nanokernel handles a per-kernel TSS stack located in the hidden part of the kernel context as shown on FIG. 13. This data structure are meaningful only for a secondary kernel context. The top of stack points to the current TSS, i.e., to the TSS pointed out by the task register. The stack is updated each time a task switch is performed to/from the secondary kernel. When a nanokernel task is activated by a task gate, the task TSS is pushed into the stack. When the nanokernel returns from a nanokernel task, the top TSS is removed from the stack. The TSS stack is also updated by the secondary ltr method which changes the native secondary TSS located at the stack bottom.

FIG. 16 shows typical states of a TSS stack. The top half of the figure depicts the TSS stack evaluation when a secondary kernel is preempted by an interrupt. The bottom half of the figure depicts the TSS stack evaluation when the nanokernel executing a long secondary operation is preempted by an interrupt. Note that the TSS stack is never empty and the maximal stack depth is limited up to three.

A native TSS is always located at the stack bottom. This TSS is used by the native secondary kernel execution environment. As was described above, a secondary kernel is started using the initial TSS located in the hidden part of the kernel context. During the initialization phase, a secondary kernel typically installs its own native TSS using the ltr nanokernel method. Such a native TSS overrides the initial one in the TSS stack.

Once a secondary kernel is preempted by an interrupt, or a nanokernel method is invoked via trap, the corresponding nanokernel task is activated by the task gate. The nanokernel task always pushes a pointer to its own TSS into the stack. In the case of interrupt, the nanokernel interrupt task simply switches to the primary kernel in order to process the interrupt. In the case of trap, the nanokernel may enable interrupts while executing code of a long method.

When interrupts are enabled, a nanokernel method can be preempted by the nanokernel interrupt task activated by a task gate and the interrupt task, in turn, switches to the primary kernel in order to process the interrupt. Once the interrupt is processed, the primary kernel returns to the nanokernel in order to resume execution of the interrupted method.

Because the trap and interrupt tasks can be nested, it is necessary to use different (non overlapped) stacks when executing the task code. The nanokernel uses a special interrupt stack in the interrupt task.

When an interrupt occurs in the trap task, the processor switches to the interrupt task and saves the general-purpose registers into the trap task TSS (which is the current TSS at this moment). Thus, once interrupts are disabled again in the trap task, it is necessary to re-initialize the EIP, EBX and ESP fields of the trap TSS because they could be corrupted by an interrupt.

Scheduler

The main role of an operating system scheduler is to choose the next task to run. Because the nanokernel controls execution of operating systems, the nanokernel scheduler chooses the next secondary operating system to run. In other words, the nanokernel adds an extra scheduling level to the whole system.

Note that, in the nanokernel architecture, the primary operating system has a higher priority level with respect to secondary systems and the CPU is given to a secondary system only when the primary one is in the idle loop. We can say that the primary kernel is not preemptable and it explicitly invokes the nanokernel scheduler through the idle method called in the idle loop. Once an interrupt occurs when running a secondary system, the primary kernel interrupt handler is invoked. From the primary kernel perspective, such an interrupt preempts the background thread executing the idle loop. Once the interrupt is handled and all related tasks are done, the primary kernel returns to the nanokernel which invokes the nanokernel scheduler in order to determine the next secondary system to run. From the primary perspective, the kernel just returns to the background thread preempted by the interrupt. The secondary activity is transparent for the primary kernel and it does not change the primary system behavior.

The nanokernel may implement different scheduling policies. By default, however, a priority based algorithm is used.

Note that, at the same priority level, the nanokernel uses a round-robin scheduling policy. Priority of a given secondary kernel is statically configured at system image build time.

Whatever the scheduling policy is implemented, the scheduler has to detect whether a given secondary system is ready to run. This condition is calculated as the bitwise logical and operation between the pending VEX and enabled VEX fields of the kernel context. A non zero result indicates that the system is ready to run.

As was described above, each bit in the pending VEX and enabled VEX pair represents a virtual exception. Rephrasing the ready to run criteria, we can say that a secondary system is in the ready to run state if there is at least one non masked pending virtual exception.

Among all virtual exceptions which are typically mapped to the hardware and software (cross) interrupts, there is a special virtual exception (running) reflecting whether the kernel is currently idle.

The running bit is cleared in the pending VEX field each time a secondary kernel invokes the idle method and the running bit is set in the pending VEX field each time a virtual exception is delivered to the secondary kernel.

The running bit is normally always set in the enabled VEX field for a running secondary kernel. The nanokernel sets this bit when a secondary kernel is started and it resets this bit when a secondary kernel is halted. The secondary kernel should never clear the running bit when masking/unmasking interrupts mapped to virtual exceptions.

Note that an external agent is able to suspend/resume execution of a secondary kernel by clearing/restoring the enabled VEX field in its kernel context. This feature opens possibilities for a scheduling policy agent to be implemented outside of the nanokernel, as a primary kernel task. In addition, this also enables a debug agent for a secondary kernel to be running as a task on top of the primary kernel. An advantage of such a secondary debug agent is that all services provided by the primary operating system become available for debugging (e.g., networking stack) and the secondary kernel debugging may be done concurrently with critical tasks running on the primary operating system.

Cross Interrupts

This section mostly consolidates information (already given in previous sections) related to the nanokernel cross interrupts mechanism.

Two following kinds of cross interrupts will be considered here:
a cross interrupt sent to a secondary kernel
a cross interrupt sent to the primary kernel In order to send a cross interrupt to a destination secondary kernel, a source kernel first sets a bit corresponding to the cross interrupt source in the pending XIRQ field of the destination kernel context. Then the source kernel posts the cross interrupt VEX to the destination kernel setting the corresponding bit in the pending VEX field of the destination kernel context. Once the cross interrupt handler is called by the nanokernel, it checks the pending XIRQ field, clears bit corresponding to the pending cross interrupt source and finally invokes handlers attached to this source. Both source and destination kernels uses atomic instructions to update the pending XIRQ field. Note that the same algorithm is used by both types of source kernel: primary and secondary.

In order to send a cross interrupt to the primary kernel, a secondary kernel first sets a bit corresponding to the cross interrupt source in the pending XIRQ field of the primary kernel context. Then the secondary kernel invokes the nanokernel executing the XIRQ trap. The nanokernel immediately preempts the secondary kernel and invokes the primary low-level cross interrupt handler which checks the pending XIRQ field, clears bit corresponding to the pending cross interrupt source and finally invokes handlers attached to this source.

The cross interrupt zero must not be used by kernels. This interrupt is reserved for the nanokernel to notify kernels that a halted kernel has been started or a running kernel has been halted. In other words, the cross interrupt zero notifies running kernels that the global system configuration is changed. It is broad casted to all running kernels each time the state of the running field is changed in a kernel context.

FPU Management

The FPU engine is a computing resource which is typically shared by all operating systems running in the nanokernel environment.

On IA-32 Intel architecture, the nanokernel manages the FPU sharing in a lazy manner. This means that when a switch from one operating system to another occurs, the FPU engine is not immediately given to the newly scheduled operating system instead, the FPU switch is deferred until the newly scheduled system really executes floating-point instructions and accesses floating-point registers.

Such a lazy FPU dispatching algorithm allows the nanokernel to reduce the system switch time. This is especially important in order to reduce the primary interrupt latency because FPU is normally not used at interrupt level and therefore it is usually not necessary to save and restore FPU registers in order to preempt a secondary operating system and to call a primary interrupt handler.

The nanokernel handles an FPU owner global variable pointing to the context of the kernel which currently uses FPU. In case there is no FPU owner, the FPU owner context is set to zero. An FPU context is located in the hidden part of the kernel context. Such a context keeps state of the FPU engine (i.e., floating-point registers and status) when the kernel is not FPU owner. Obviously, the state of the FPU owner is kept by the FPU engine hardware. When the nanokernel changes the FPU owner, the FPU state is saved to the old FPU context and restored from the new one.

The nanokernel uses the emulation bit (EM) of the CR0 register in order to provoke an exception when FPU is used by a non FPU owner. The CR0 register image takes a part in the hidden part of the kernel context. The CR0 register is saved (to the old context) and restored (from the new context) at system switch. The EM bit is set in all kernel contexts except the FPU owner where it is cleared. In addition, the nanokernel intercepts the invalid opcode (#UD) and the device not available (#NM) exceptions for all non FPU owners while the FPU owner handles these exceptions in a native way.

An FPU switch occurs when the nanokernel intercepts one of the FPU related exceptions: #UD or #NM. In order to switch the FPU engine between two kernels, the nanokernel releases the current FPU owner and assigns the new one.

In order to release the current FPU owner, the nanokernel saves the current FPU state in the kernel context and sets the EM bit in the CR0 register image. In addition, the nanokernel gates are installed in the real IDT in order to intercept the #UD and #NM exceptions.

In order to assign a new FPU owner, the nanokernel restores the FPU state from the kernel context and clears the EM bit in the CR0 image. In addition, the native gates are installed in the real IDT in order to handle the #UD and #NM exceptions in a native way while owning FPU.

The nanokernel uses the OSFXSR bit of the CR4 register in order to optimize the saving and restoring operations. The CR4 register image takes a part in the hidden part of the kernel context. It is saved (to the old context) and restored (from the new context) at system switch. The nanokernel uses the CR4 register image in order to determine which type of FPU context should be saved or restored: standard or extended. This allows the nanokernel to do not save/restore the extended FPU context for an operating system which uses neither MMX nor SIMD features.

Because the nanokernel uses the EM bit of the CR0 register in order to implement a lazy FPU switch, a kernel is not allowed to change the state of this bit. In particular, this means that the FPU emulation is not supported by a kernel ported to the nanokernel architecture.

Note that usually an operating system kernel uses the TS bit of the CR0 register in order to implement a lazy FPU switch between processes. Because the CR0 register image takes a part in the kernel context and therefore it is saved and restored at system switch, the native FPU management can be kept almost unchanged in the nanokernel environment.

Note however that the TS bit is automatically set by a task switch. This means that FPU exceptions can occur in a secondary kernel even if TS bit is logically cleared from the kernel point of view. Such spurious FPU exceptions are introduced by task gates used by the nanokernel in order to intercept secondary exceptions. In order to detect such spurious FPU exceptions and quietly ignore them (just clearing the TS bit), a secondary kernel should handle a software copy of the TS bit. The nanokernel assists to secondary kernel in this task providing a field dedicated for this purpose in the kernel context.

OTHER ASPECTS AND EMBODIMENTS

It will be clear from the forgoing that the above-described embodiments are only examples, and that many other embodiments are possible. The operating systems, platforms and programming techniques mentioned may all be freely varied. Any other modifications, substitutions and variants which would be apparent to the skilled person are to be considered within the scope of the invention, whether or not covered by the claims which follow. For the avoidance of doubt, protection is sought for any and all novel subject matter and combinations thereof disclosed herein.

The invention claimed is:

1. A method of enabling multiple different operating systems to run concurrently on the same computer, comprising:
    selecting a first operating system to have a relatively high priority, said first operating system possibly being a real time operating system;
    selecting at least one second operating system to have a relatively lower priority;
    providing a common program arranged to switch between said operating systems under predetermined conditions, the common program being arranged to save, and to restore from a saved version, the processor state required to switch between the operating systems;
    providing modifications to said first and second operating systems to allow them to be controlled by said common program,
    wherein the first and second operating systems are associated with first and second memory contexts, respectively, and the common program is associated with a third memory context,
    switching a current memory context to the first memory context when switching to or from the first operating system; and
    switching the current memory context to the third memory context when switching from the second operating system;
    wherein, when the common program is invoked by the first operating system, execution of the common program is started in the first memory context, and
    wherein, when the common program is invoked by the second operating system, using the third memory context as an intermediate address space.

2. The method of claim 1, comprising switching the current memory context to the first, second or third memory context when switching between said operating systems.

3. The method of claim 1, further comprising preempting the first operating system by the common program, and starting execution of the common program in the first memory context.

4. The method of claim 1, further comprising preempting the second operating system by the common program, wherein the current memory context is the third memory context.

5. The method of claim 4, wherein the second operating system invokes the common program by a trap call.

6. The method of claim 1, in which the first operating system is a real time operating system.

7. The method of claim 1, in which the second operating system is a non-real time, general-purpose operating system.

8. The method of claim 1, in which the second operating system is Linux, or a version or variant thereof.

9. The method of claim 1, in which processor exceptions for the second operating system are handled in virtual fashion by the common program.

10. The method of claim 1, in which the common program is arranged to intercept some processor exceptions, and to call exception handling routines of the first operating system to service them.

11. The method of claim 1, in which the processor exceptions for the second operating system are notified as virtual exceptions.

12. The method of claim 11, in which the common program is arranged to call an exception handling routine of the second operating system corresponding to a said virtual exception which is pending.

13. The method of claim 1, further comprising providing each of said operating systems with separate memory spaces in which each can exclusively operate.

14. The method of claim 1, further comprising providing each of said operating systems with first input and/or output devices of said computer to which each has exclusive access.

15. The method of claim 1, in which each operating system accesses said first input and/or output devices using substantially modified native routines.

16. The method of claim 1, further comprising providing each of said operating systems with access to second input and/or output devices of said computer to which each has shared access.

17. The method of claim 16, in which all operating systems access said second input and/or output devices using the routines of the first operating system.

18. The method of claim 16, in which said second device comprises a co-processor, and in which, on switching between said first operating system and said second (or vice versa), the state of said co-processor is not changed, whereby if said operating systems switch back without intervening access to said coprocessor, its operation can complete uninterrupted.

19. The method of claim 1, further comprising providing a restart routine for restarting a said second operating systems without interrupting operation of said first, or said common program.

20. The method of claim 1, in which one or more original address tables are provided by the computer for use by an operating system, and in which the common program accesses said original address tables, and provides a plurality of replicated tables having the same structure as said original tables, elsewhere in memory, one per table per operating system, each for use by a respective operating system, and in which said operating systems are modified so as to replace instructions which write said original address tables with routine calls which access said replicated tables.

21. The method of claim 1, further comprising combining said operating systems and common program into a single code product.

22. The method of claim 1, further comprising embedding said operating systems and common program onto persistent memory on a computer product.

23. The method of claim 1, in which each said operating system is provided with an idle routine, in which it passes control to the common program.

24. The method of claim 23, in which said idle routine substitutes for a processor halt instruction.

25. A development kit computer program product stored in a memory and comprising code that, when executed by a processor, performs the steps of claim 1.

26. An embedded computer system comprising a CPU, memory devices and input/output devices, having stored on persistent memory therein programs embedded according to claim 25.

27. The method of claim 1 in which the computer has a Complex Instruction Set architecture.

28. A computer system comprising a CPU, memory devices and input/output devices, having executing thereon computer code comprising:
- a first operating system having a relatively high priority, said first operating system possibly being a real time operating system;
- a second operating system having a relatively lower priority; and
- a common program arranged to run said operating systems concurrently by switching between said operating systems under predetermined conditions, the common program being arranged to save, and to restore from a saved version, the processor state required to switch between the operating systems;
  wherein the first and second operating systems are associated with first and second memory contexts, respectively, and the common program is associated with a third memory context,
  wherein when switching to or from the first operating system, a current memory context is switched to the first memory context;
  wherein when switching from the second operating system, the current memory context is switched to the third memory context;
  wherein, when the common program is invoked by the first operating system, execution of the common program is started in the first memory context, and
  wherein, when the common program is invoked by the second operating system, using the third memory context as an intermediate address space.

29. A computer system according to claim 28, arranged to run said first and second operating systems concurrently using the method as described above.

30. A computer system comprising a processor and a memory to execute thereon computer code to operate first and second operating systems in first and second memory contexts, respectively, said first operating system possibly being a real time operating system and a common program configured to execute in said first or a third memory context to switch between the first and second operating systems, the common program being arranged to save, and to restore from a saved version, the processor state required to switch between the operating systems; wherein, when the common program is invoked by the first operating system, execution of the common program is started in the first memory context,
  wherein when switching to or from the first operating system, a current memory context is switched to the first memory context;
  wherein when switching from the second operating system, the current memory context is switched to the third memory context; and
  wherein, when the common program is invoked by the second operating system, using the third memory context as an intermediate address space.

* * * * *